United States Patent [19]
Akiyama et al.

[11] Patent Number: 5,488,599
[45] Date of Patent: Jan. 30, 1996

[54] OPTICAL PICK-UP DEVICE WITH A MULTIFUNCTIONAL PRISM

[75] Inventors: Hiroshi Akiyama; Yoshitaka Takahashi, both of Yokohama, Japan

[73] Assignee: Ricoh Co., Ltd., Tokyo, Japan

[21] Appl. No.: 191,599

[22] Filed: Feb. 4, 1994

[30] Foreign Application Priority Data

| Feb. 5, 1993 | [JP] | Japan | 5-040714 |
| Aug. 27, 1993 | [JP] | Japan | 5-234336 |
| Sep. 3, 1993 | [JP] | Japan | 5-242124 |
| Dec. 28, 1993 | [JP] | Japan | 5-349198 |

[51] Int. Cl.⁶ .................................................. G11B 7/135
[52] U.S. Cl. .................. 369/112; 369/44.14; 369/44.23; 369/110; 359/837
[58] Field of Search ................... 369/112, 44.23, 369/116, 100, 64.12, 44.14, 109, 110, 118; 359/211, 218, 669, 837

[56] References Cited

U.S. PATENT DOCUMENTS

| 4,770,507 | 9/1988 | Arimoto et al. | 359/837 |
| 5,073,888 | 12/1991 | Takahashi et al. | 369/112 |
| 5,220,553 | 6/1993 | Ando et al. | 369/112 |
| 5,293,372 | 3/1994 | Hoshino et al. | 369/112 |
| 5,331,622 | 7/1994 | Ernst et al. | 369/112 |

FOREIGN PATENT DOCUMENTS

| 62-298034 | 12/1987 | Japan . |
| 4-11341 | 1/1992 | Japan . |
| 5-157910 | 6/1993 | Japan . |
| 6-28703 | 2/1994 | Japan . |

*Primary Examiner*—Georgia Y. Epps
*Assistant Examiner*—Kim-Kwok Chu
*Attorney, Agent, or Firm*—Cooper & Dunham

[57] ABSTRACT

The present invention provides an optical pickup device which enables cost reduction and has improved optical characteristics. In the optical pickup device according to the present invention, as a function to shape a light flux outputted from a semiconductor laser chip to a substantially circular beam and a function to separate reflected light from an optical recording medium from the source light are realized with one optical element, a number of required parts can be reduced, which in turn enables substantial cost reduction as well as size reduction of the device.

11 Claims, 21 Drawing Sheets

TO LIGHT DETECTION
SYSTEM

OPTICAL PICK-UP DEVICE WITH A MULTIFUNCTIONAL PRISM

FIELD OF THE INVENTION

The present invention relates to an optical pickup device which shapes a light flux outputted from a semiconductor laser chip to a substantially circular beam, then focuses the beam onto an optical recording medium, separates the reflected light from the optical recording medium from source light, and guides the reflected light separated as described above to a specified light detection system.

BACKGROUND OF THE INVENTION

In an optical pickup device such as, for instance, a photoelectromagnetic disk, used for recording/playing back data in or deleting data from an optical recording medium, a semiconductor laser chip is used as laser light source.

Generally in case of a light flux outputted from a semiconductor laser chip, an angle in which the beam extends in the direction parallel to an active layer of a chip in the semiconductor laser chip is different from that in the direction vertical to the active layer of the chip in the semiconductor laser chip, and for this reason the cross section thereof is oval.

If a laser beam having an oval cross section is focused as it is onto an optical recording medium, such troubles as decrease in the recording density occur, so that adjustment is executed by using a beam shaping element so that a cross section of a flux outputted from the semiconductor laser chip will become oval.

FIG. 25 is a drawing illustrating a key section of an optical system in a conventional type of optical pickup device.

In this figure, laser light outputted from a semiconductor chip 1 is converted to parallel light by a coupling lens 2, goes into on a surface 3a of a beam shaping prism 3, and refracts on the surface 3a with the beam form shaped to a substantially oval form. Then the laser light subjected to beam shaping goes out from a face 3b of the beam shaping prism 3 into a beam splitter 4.

Of the laser light going into the beam splitter 4, a portion thereof which transmitted a face 4a for light separation is deflected by a deflection prism 5, guided to a object lens 6, and focused onto an optical recording medium 7 by the object lens 6.

The reflected light from the optical recording medium 7 is converted by the object lens 6 to substantially parallel light, reflected on the deflection prism 5, and is entered into the beam splitter 4. Then, of the reflected light going into the beam splitter 4, a portion thereof reflected on the light separating surface 4a of the beam splitter 4 is guided to an light detection system.

In this light detection system, reflected light from the optical recording medium 7 transmits a ½ waveform plate L with the polarization face turned by 45°, and is focused in the state by a focusing lens 8 and entered into the polarized beam splitter 9, and the p polarized portion which transmitted a face 9a for light separation of this polarized beam splitter 9 is received by a light receiving element 10, while the s polarized portion reflected on the face 9a for light separation is received by a light receiving element 11.

Also in this case, the beam shaping prism 3 to execute beam shaping for laser light outputted from the semiconductor chip 1 is adhered to the beam splitter 4 to separate the reflected light from the optical recording medium 7 from the source light, so that the two components can be treated as a single optical element 12. By using this optical element 12, easiness to assemble the device can be improved.

FIG. 26 indicates another example of an optical pickup device based the conventional configuration.

Namely, this optical pickup device emits laser light from a semiconductor laser 101A and converts the emitted light to parallel light through a coupling lens 102A. Then the light is passed through a beam shaping prism 103A to shape a light flux cross section of the laser light to a circular form.

Generally a light flux cross section of light emitted from a semiconductor laser chip is narrow in the direction parallel to an active layer of the chip and wide in the direction vertical to the inactive layer, so a form of the cross section is generally oval. If a laser spot on an optical disk is oval, various trouble occur, so a cross section of laser light is adjusted to a circular one.

The laser light shaped as described above is guided via a beam splitting element 104A to the optical disk side. Then, the laser light is focused by an object lens and irradiated onto an optical disk.

Also the reflected light from the optical disk is returned to the light splitting element 104A. All of a portion of the reflected light from the optical disk passes through the beam splitting element 104A, and is guided to a light detection system.

FIG. 27 is a drawing illustrating other example of configuration of an optical pickup device.

In this case of optical pickup device, laser light emitted from the semiconductor laser 101A is converted by the coupling lens 105A to parallel light, and at the same time a light flux cross section of the laser light is shaped to a circular one. Namely the hatched section in this figure indicates an extension of a oval light flux emitted from the semiconductor 101A in the direction of major axis thereof, and a diameter of the coupling lens 105A in the direction is narrower than the extension. Because of this feature, an outer peripheral section of the light flux in the direction of major axis thereof is cut off, and the light flux cross section becomes substantially circular after the parallel flux passed through the coupling lens 105A.

However, there are the following disadvantages in the conventional types of device as described above.

In the case shown in FIG. 25, as the beam shaping prism 3 and the beam splitter 4 are adhere to each other to make up the optical element 12, a number of optical parts becomes larger, which is disadvantageous.

Also in case of the configuration shown in FIG. 26, a number of optical parts such as the coupling lens 102A, beam shaping prism 103A, and beam splitting element 104A are necessary, which disadvantageously results in high production cost of the device.

Also in case of the configuration shown in FIG. 27, as the beam shaping prism 103A is not necessary, a number of parts can be reduced, but an outer peripheral section of the light flux in the direction of major axis thereof is cut off to shape the oval light flux, use efficiency of the light emitted from the semiconductor laser 101A disadvantageously drops.

SUMMARY OF THE INVENTION

It is an object of the present invention to provide an optical pickup device which enables cost reduction and has improved optical characteristics.

The present invention provides an optical pickup device which shapes a light flux outputted from a semiconductor laser chip to a beam having a substantially circular cross section, focuses the light onto an optical recording medium, separates the reflected light from the optical recording medium from the source light, and then guide the reflected light separated from the source light as described above to a specific light detection system, having a multi-functional prism comprising a single body prism having a surface to execute beam shaping for the reflected light and separate the reflected light from the source light. Also the multi-functional prism has a bottom face having a form like a right-angled isosceles triangle, and a face corresponding to a bottom edge of the cross section functions as a beam shaping face as well as a light separating face. Also in the multi-functional prism, a beam shaping face and a light separating face are formed on the same plane, and of the side faces a face to which a light flux subjected to beam shaping is irradiated and a face from which the light flux after light separation goes out are set at non-right angles against each optical axis. Also in the multi-functional prism, assuming that an incidence angle of a light flux outputted from the semiconductor laser chip is a, an angle between an incidence face for this light flux and a first outgoing irradiation face from which the light flux subjected to beam shaping $\alpha$, an angle between the foregoing incidence face and a second outgoing irradiation face from which the light flux subjected to light separation $\beta$, and a index of refraction of a material for this multi-functional prism n, there is a relation among the a, $\alpha$, $\beta$, and n as indicated by the following expression.

$$\alpha + \beta + \left| \sin^{-1}\left[ n\sin\left\{ \sin^{-1}\left( \frac{\sin a}{n} \right) - \alpha \right\} \right] \right| + \left| \sin^{-1}\left[ n\sin\left\{ \sin^{-1}\left( \frac{\sin a}{n} \right) - \beta \right\} \right] \right| \sim 90°$$

Also of the side faces of the multi-functional prism, a face from which a beam light flux goes out and a face for light separation are set on the same plane. Also in this multi-functional prism, assuming that an incidence angle of a light flux outputted from the semiconductor laser chip is a, an angle between the light flux incidence face and the face from which the light flux subjected to beam shaping goes out $\alpha$, and an index of refraction of a material for this multi-functional prism n, there is a relation among a, $\alpha$ and n as shown by the following expression.

$$\left| \sin^{-1}\left( \frac{\sin a}{n} \right) \right| + \left| \sin^{-1}\left( \frac{\sin 45°}{n} \right) \right| \sim \alpha$$

Also the optical pickup device according to the present invention, which shapes a light flux outputted from a semiconductor laser chip to a beam having a substantially circular cross section, focuses the light onto an optical recording medium, separates the reflected light from the optical recording medium from the source light, and then guide the reflected light separated from the source light as described above to a specific light detection system, has a multi-functional prism comprising a single body prism having a single face having a function for beam shaping for the light flux as well as a function to separate the reflected light from the source light, and in the foregoing multi-functional prism, a first outgoing irradiation face from which the light flux subjected to beam shaping goes out to the side of optical recording medium does not cross the optical axis of the outgoing light flux at right angles and at the same time the optical axis of the light flux passing through the first outgoing irradiation face crosses the optical axis of the light flux passing through the second light detection system at right angles.

Also the optical pickup device according to the present invention, which shapes a light flux outputted from a semiconductor laser chip to a beam having a substantially circular cross section, focuses the light onto an optical recording medium, separates the reflected light from the optical recording medium from the source light, and then guide the reflected light separated from the source light as described above to a specific light, has a multi-functional prism comprising a single body prism having single face having a function for beam shaping for the light flux as well as a function to separate the reflected light from the source light, and a quarter wavelength plate is monolithically attached to an outgoing irradiation face of this multi-functional prism from which the light flux goes out to the side of the optical recording medium.

Also the optical pickup device according to the present invention, which shapes a light flux outputted from a semiconductor laser chip to a beam having a substantially circular cross section, focuses the light onto an optical recording medium, separates the reflected light from the optical recording medium from the source light, and then guide the reflected light separated from the source light as described above to a specific light, has a multi-functional prism comprising a single body prism having a single face having a function for beam shaping for the light flux as well as a function to separate the reflected light from the source light, and in this multi-functional prism, a first outgoing irradiation face from which the light flux subjected to beam shaping goes out to the side of an optical recording disk does not cross the optical axis of the outgoing light flux at right angles, at the same time the optical axis of the light flux passing through the first outgoing irradiation face crosses the optical axis of the light flux passing through the second outgoing irradiation face in the side of the light detection system at right angles, and in addition a quarter wavelength plate is monolithically attached to a face from which the light flux goes out to the side of the optical recording medium.

Also the optical pickup device according to the present invention, which shapes a light flux outputted from a semiconductor laser chip to a beam having a substantially circular cross section, focuses the light onto an optical recording medium, separates the reflected light from the optical recording medium from the source light, and then guide the reflected light separated from the source light as described above to a specific light, has a multi-functional prism comprising a single body prism having single face having a function for beam shaping for the light flux as well as a function to separate the reflected light from the source light, and in this multi-functional prism an outgoing irradiation face from which the light flux subjected to beam shaping goes out to the side of an optical recording medium does not cross the optical axis of the outgoing light flux at right angles, and a half wavelength plate is monolithically attached to the outgoing irradiation face from which the light flux goes out to the light detection system.

Also the optical pickup device according to the present invention, which shapes a light flux outputted from a semiconductor laser chip to a beam having a substantially circular cross section, focuses the light onto an optical recording medium, separates the reflected light from the optical recording medium from the source light, and then guide the reflected light separated from the source light as described above to a specific light, has a multi-functional prism comprising a single body prism having single face having a function for beam shaping for the light flux as well as a function to separate the reflected light from the source light, and in this multi-functional prism a first outgoing irradiation face from which the light flux subjected to beam shaping goes out to the side of an optical recording medium does not cross the optical axis of the outgoing light flux, at the same time the optical axis of the light flux passing through the first outgoing irradiation face crosses the optical axis of the light flux passing through the second out going irradiation face in the side of the light detection system at right angles, and in addition a half wavelength plate is monolithically attached to the face.

Also the optical pickup device according to the present invention, which shapes a light flux outputted from a semiconductor laser chip to a beam having a substantially circular cross section, focuses the light onto an optical recording medium, separates the reflected light from the optical recording medium from the source light, and then guide the reflected light separated from the source light as described above to a specific light, has a first wedge-shaped prism to shape the beam light flux and a second wedge-shaped prism combined with and connected to the first wedge-shaped prism, and a junction face between the first wedge-shaped prism and the second wedge-shaped prism functions as a face for light separation.

Also the first wedge-shaped prism and the second wedge-shaped prism have the same form and an inclined face of the first wedge-shaped prism is jointed to that of the second wedge-shaped prism to form a pair of parallel planes.

Also in the first wedge-shaped prism, assuming that an incidence angle of an incoming light flux to the first wedge-shaped prism is a, an index of refraction of the first wedge-shaped prism n, and a vertical angle of the first wedge-shaped prism x, the a, n and x satisfy the following relational expression.

$$\cos(a) = n \cdot \sin(\arcsin((\sin(a))/n) - 2 \cdot x)$$

For the reasons as described above, the optical pickup device according to the present invention has a function to shape a light flux outputted from a semiconductor laser chip to a beam having a substantially circular cross section and a function to separate the reflected light from the source light, a number of required parts decreases, which enables substantial reduction of cost for the device and minimization of the device.

Also the internal reflection element on the outgoing irradiation face from which the light flux subjected to beam shaping goes out does not go to a light detection system, external disturbance by this internal reflection element can be prevented.

Also the beam shaping and beam separation as described above are executed by one optical element, so that a number of required optical parts can be reduced.

As described above, with the present invention, it is possible to realize a function to shape a form of light flux outputted from a semiconductor laser chip to a substantially circular one and a function to separate light reflected from an optical recording medium from the source light with one optical element, a number of required parts can be reduced and as a result the device cost can substantially be reduced, and also a size of the device can advantageously be minimized.

Also the internal reflection element at the outgoing irradiation face from which a light flux subjected to beam shaping goes out does not go into a light detection system, so that it is possible to prevent external disturbance by this internal reflection element.

Also the optical element irradiates an incoming light flux as a whole to the outside, so that the laser light irradiated from a semiconductor laser can effective be utilized.

Other objects and features of this invention will become understood from the following description with reference to the accompanying drawings.

DESCRIPTION OF THE PREFERRED EMBODIMENTS

Next detailed description is made for embodiments of the present invention with reference to attached drawings.

Figure 1:
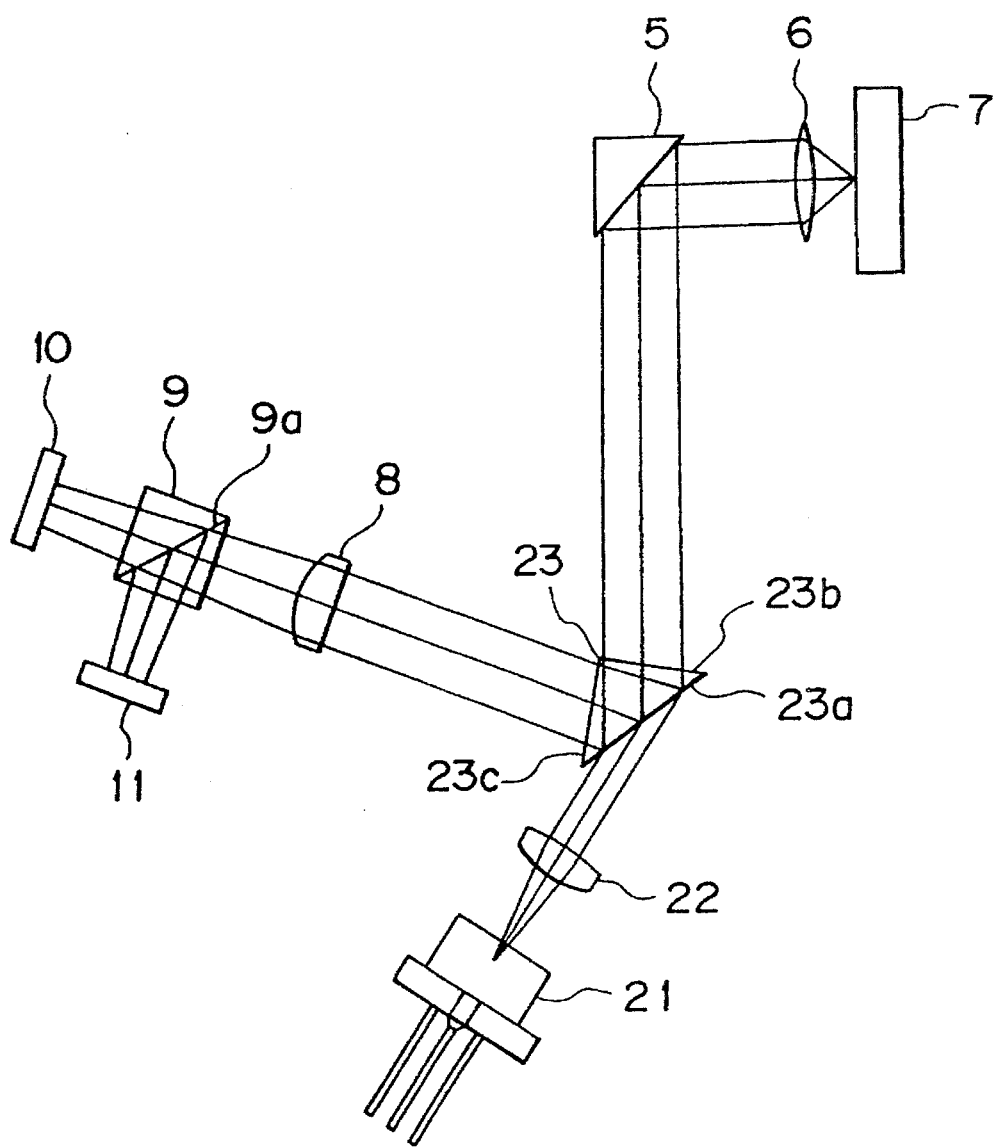
FIG. 1 is a schematic view illustrating a key section of an optical system in an optical pickup device according to one embodiment of the present invention.
Figure 25:
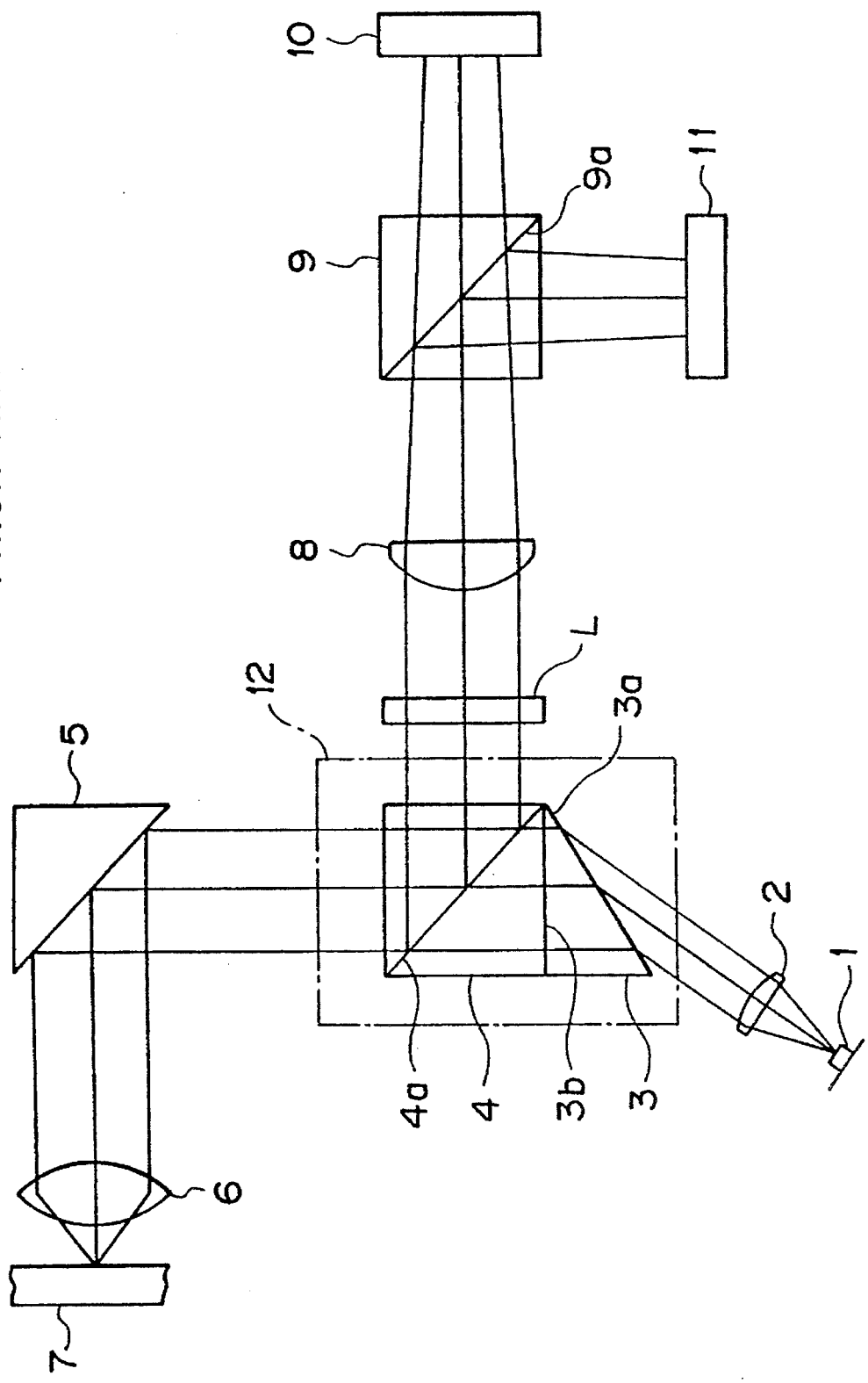
FIG. 25 is a schematic view illustrating a conventional type of optical pickup device.
Figure 26:
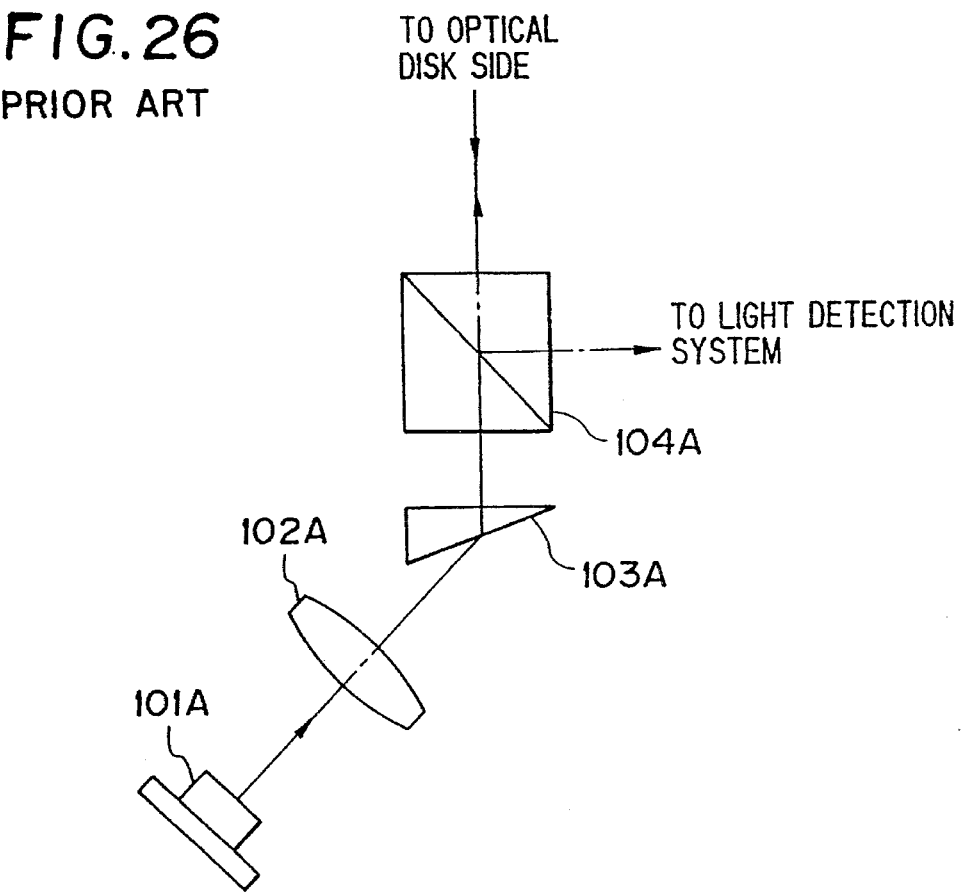
FIG. 26 is a schematic view illustrating another example of a key section of a conventional type of optical pickup device.

FIG. 1 is a view illustrating a key section of an optical system in an optical pickup device according to an embodiment of the present invention. It should be noted that the same symbols are assigned to sections which are identical or equivalent to those in FIG. 25.

In this figure, laser light outputted from a semiconductor laser chip 21 is converted to parallel light by a coupling lens 22, irradiated onto a face 23a of a multi-functional prism 23, which is a triangle pole having a right-angled isosceles triangle cross section, refracted on this face 23a, and subjected to beam shaping effect in this refraction step with the cross-sectional form shaped to a substantially circular one. Herein the face 23a is a side face corresponding to a bottom edge of the right-angles isosceles triangle which is a cross section of the multi-functional prism 23.

Then the laser light subjected to beam shaping goes out from the face 23b of the multi-functional prism 23, and is deflected by the deflection prism 5, guided to the object lens 6, and focused onto the optical recording medium 7.

The reflected light from the optical recording medium 7 is converted to parallel light by 20 the object lens 6, and is reflected by the deflection prism 5, then at first goes into the multi-functional prism 23 from the face 23b thereof, and is reflected on the face 23a, goes out of the multi-functional prism 23 from another face 23c opposing the face 23b with a right angle therebetween, and is guided to a light detection system.

If, for instance, a photoelectromagnetic disk is used as the recording medium 7, it is preferable to form a multi-layered film with a transmission ratio of p polarized light of 70%, reflection factor of 30%, and reflection factor of S polarized light of 100%.

Thus, in this embodiment, a beam shaping function for an output light flux from the semiconductor laser chip 21 and a function to separate the reflection light from the optical recording medium 7 from the source light are realized by using one piece of multi-functional prism 23, so that a number of optical parts in an optical pickup device can be reduced and thereby also it is possible to reduce the device cost and minimize an optical pickup device.

By the way, in the embodiment shown in FIG. 1, an angle between an optical axis of a light flux going from the multi-functional prism 23 to the deflection prism 5 and an optical axis of a light flux going from the multi-functional prism 23 to the light detection system is smaller than 90°, and for this reason a degree of freedom in designing an optical system goes lower.

In order to eliminate the disadvantages as described above, if magnification in beam shaping by the multi-functional prism 23 is around 2.0, it is preferable to use glass material having an index of refraction of 1.3 to around 1.4 to a wavelength of laser light outputted from the semiconductor laser chip 21 as material for the multi-functional prism 23. In this case, as shown in FIG. 2, an angle between an optical axis of a light flux from the multi-functional prism 23 to the deflection prism 5 and an optical axis of a light flux going from the multi-functional prism 23 to the light detection system can be set to around 90°.

Figure 2:
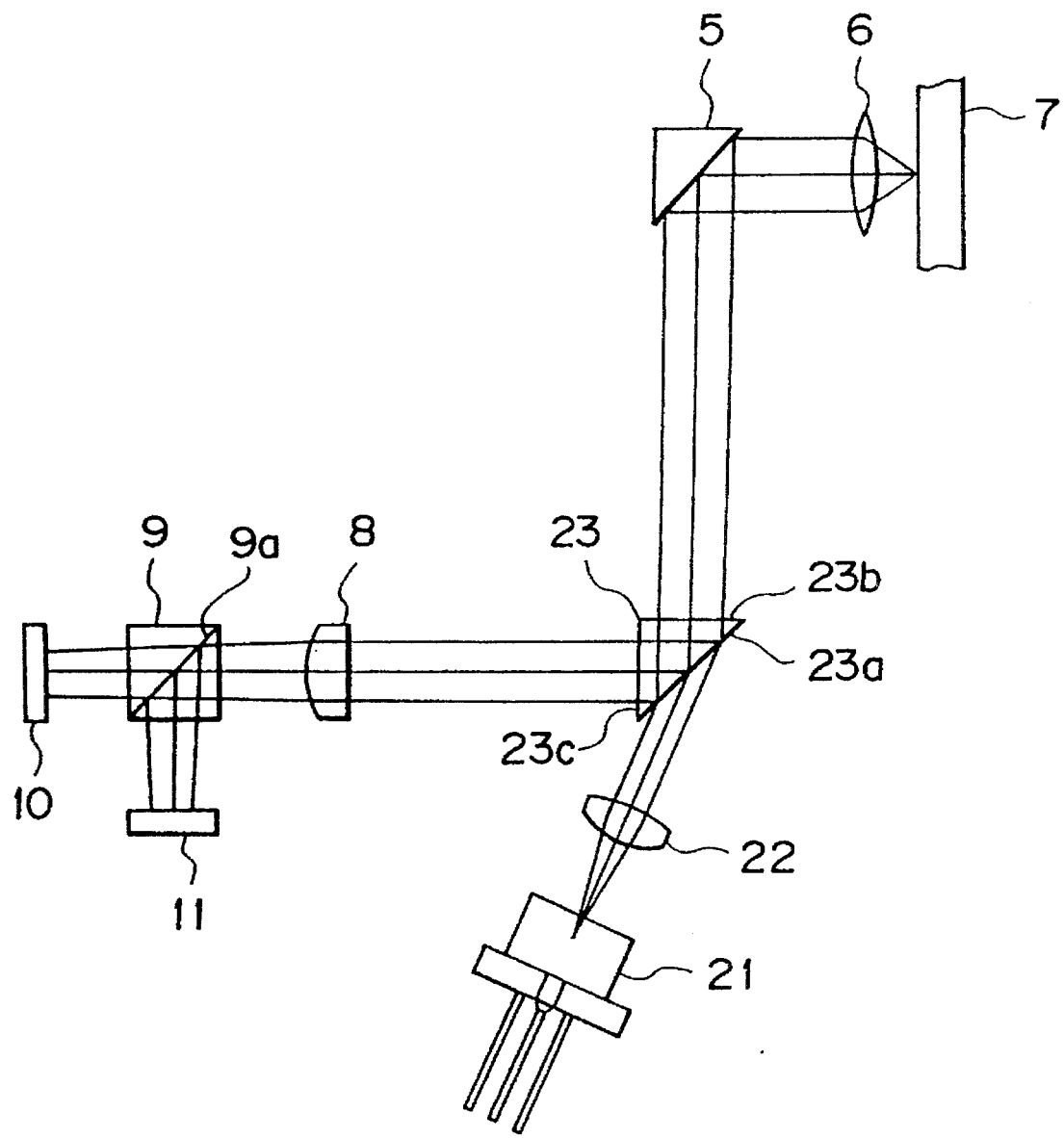
FIG. 2 is a schematic view illustrating a key section of an optical pickup device according to another embodiment of the present invention.

It should be noted that, in FIG. 2, the same symbols are assigned to sections which are identical or equivalent to those in FIG. 1.

Figure 3:
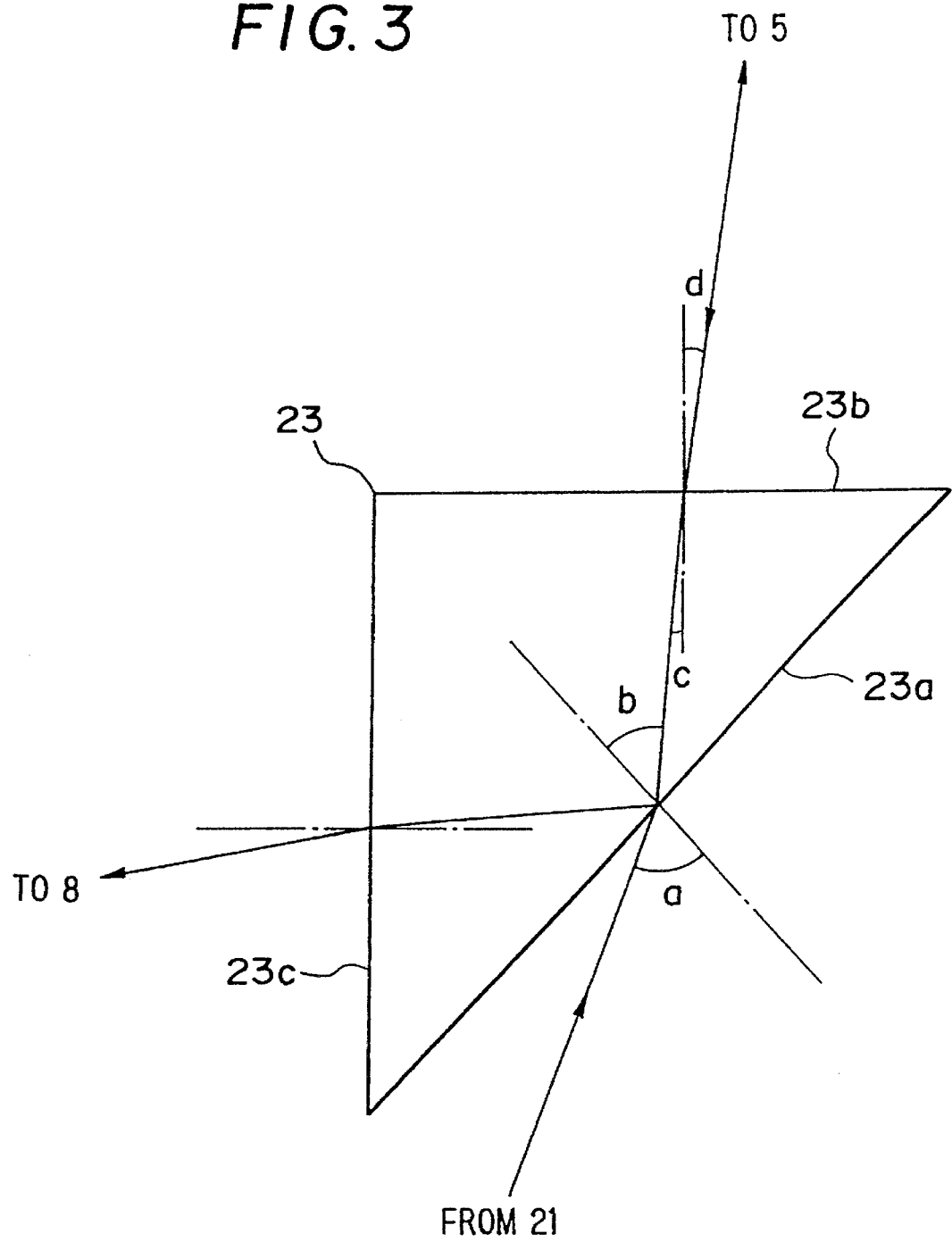
FIG. 3 is a schematic view illustrating magnification in beam shaping by a multi-functional prism shown in FIG. 2.

Also in this case, as shown in FIG. 3, assuming that an incidence angle of a light flux outputted from the semiconductor laser chip 21 to the face 23a of the multi-functional prism 23 is a, an angle of refraction on the face 23a b, an incidence angle of the light flux to the face 23b c, an angle of refraction on the face 23b d, an index of refraction of the multi-functional prism 23 n, and magnification in beam shaping m, there are relations among these factors as expressed by the expressions (1) to (3) below.

$$\sin a = n\sin b \quad (1)$$
$$\sin d = n\sin c \quad (2)$$
$$m = \frac{\cos b}{\cos a} \cdot \frac{\cos d}{\cos a} \quad (3)$$

By the way, in the embodiment shown in FIG. 2, specific glass having an index of refraction in a range from 1.3 to 1.4 to a wavelength of laser light outputted from the semiconductor laser chip 21 is used as material for the multi-functional prism 23 (an index of refraction of ordinary glass material is around 1.5), cost of this multi-functional prism 23 is very expensive.

Figure 4:
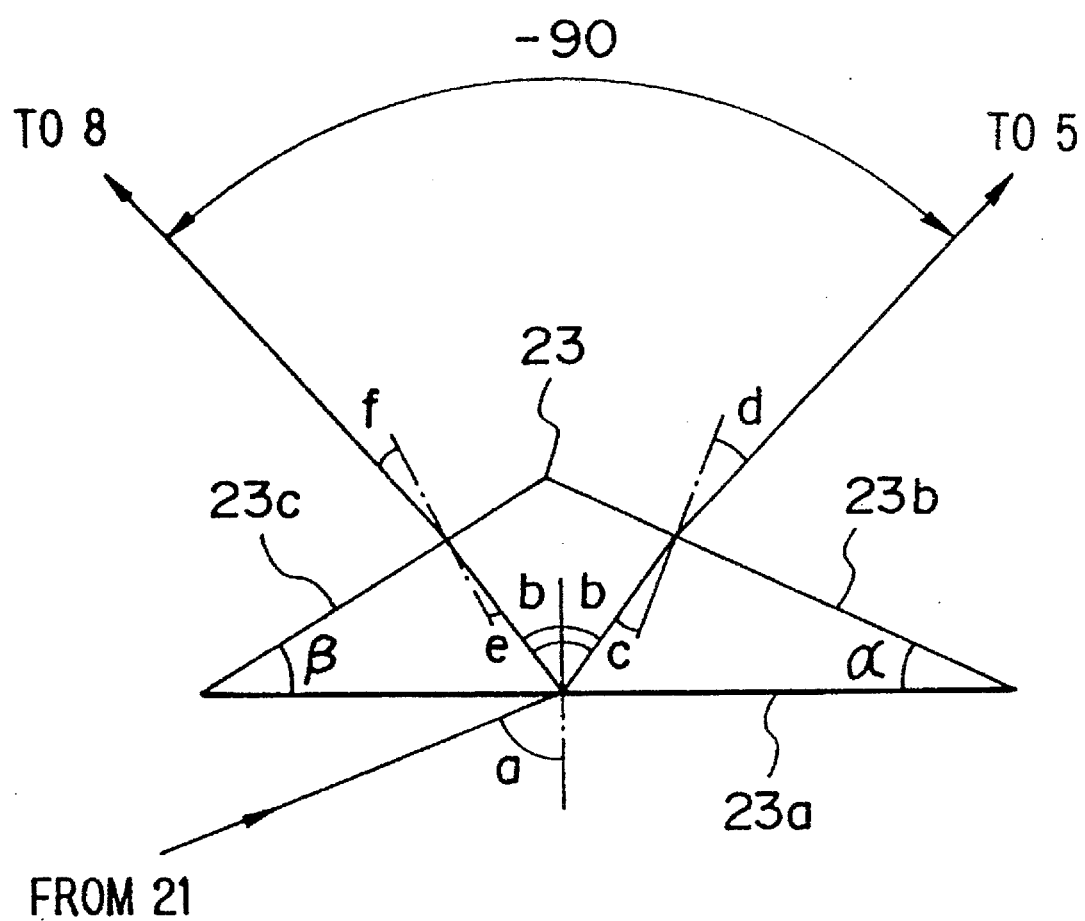
FIG. 4 is a schematic view illustrating an example of a multi-functional prism.

So in order to realize the multi-functional prism 23 by using ordinary glass material with an index of refraction of around 1.5 to a wavelength of laser light outputted from the semiconductor laser chip 21, it is preferable to use, for instance, a triangle pole having a cross section which is an obtuse triangle, as shown in FIG. 4.

In this case, assuming that an incidence angle of an output light flux from the semiconductor chip 21 to the face 23a of the multi-functional prism 23 is a, an angle of refraction on the face 23a b, an incidence angle of the light flux to the face 23b c, an angle of refraction on the face 23b d, and incidence angle of the light flux to the face 23c e, an angle of refraction on the face 23c f, an angle between the face 23a and the face 23b α, an angle between the ace 23a and the face 23c β, and an index of refraction of the multi-functional prism 23 n, there is a relation among these factors as expressed by the following expression (4).

$$\alpha+\beta+|\sin^{-1}[n \sin \{\sin^{-1}(\sin a/n)-\alpha\}]|+|\sin^{-1}[n \sin \{\sin^{-1}(\sin a/n)-\beta\}]|-90 \quad (4)$$

Also, as an angle between the faces 23b, 23c of the multi-functional prism 23 and the optical axis is not 90°, it is possible to prevent light reflected on these faces from returning to the semiconductor laser chip 21, or from being irradiated as flare light to the light detection system.

Figure 5:
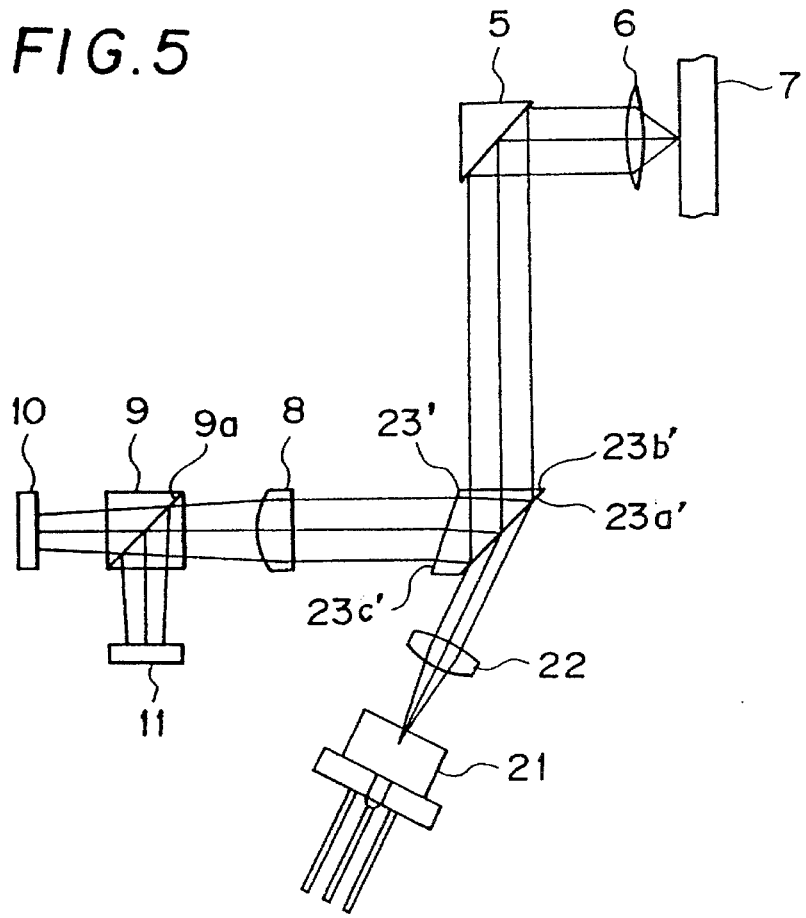
FIG. 5 is a schematic view illustrating a key section of an optical system in an optical pickup device according to a further different embodiment of the prevent invention.
Figure 6:
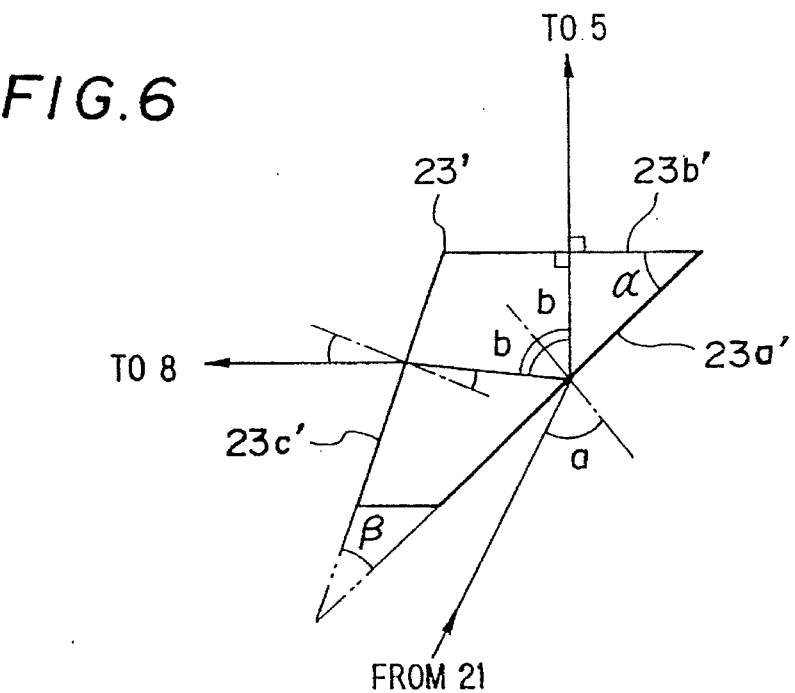
FIG. 6 is a schematic view illustrating a multi-functional prism shown in FIG. 3.

FIG. 5 and FIG. 6 are views each illustrating a key section of an optical system in an optical pickup device according to another embodiment of the present invention. It should be noted that, in the figures, the same symbols are assigned to sections which are identical or equivalent to those in FIG. 1 and FIG. 4.

In this case, a form of the multi-functional prism 23' is set so that the face 23b', from which laser light goes out to the deflection prism 5, is at right angles with the optical axis.

Also in this case, if it is assumed that a wavelength of laser light outputted from the semiconductor laser chip 21 is 780 (nanometers) and the index of refraction of the multi-functional prism 23' to this wavelength is 1.511, then the incidence angle a is 69.7°, the angle α between the face 23a' and the face 23b' of the multi-functional prism 23' is 42.2°, and the angle β between the face 23a' and the face 23c' is 28.65°.

Figure 7:
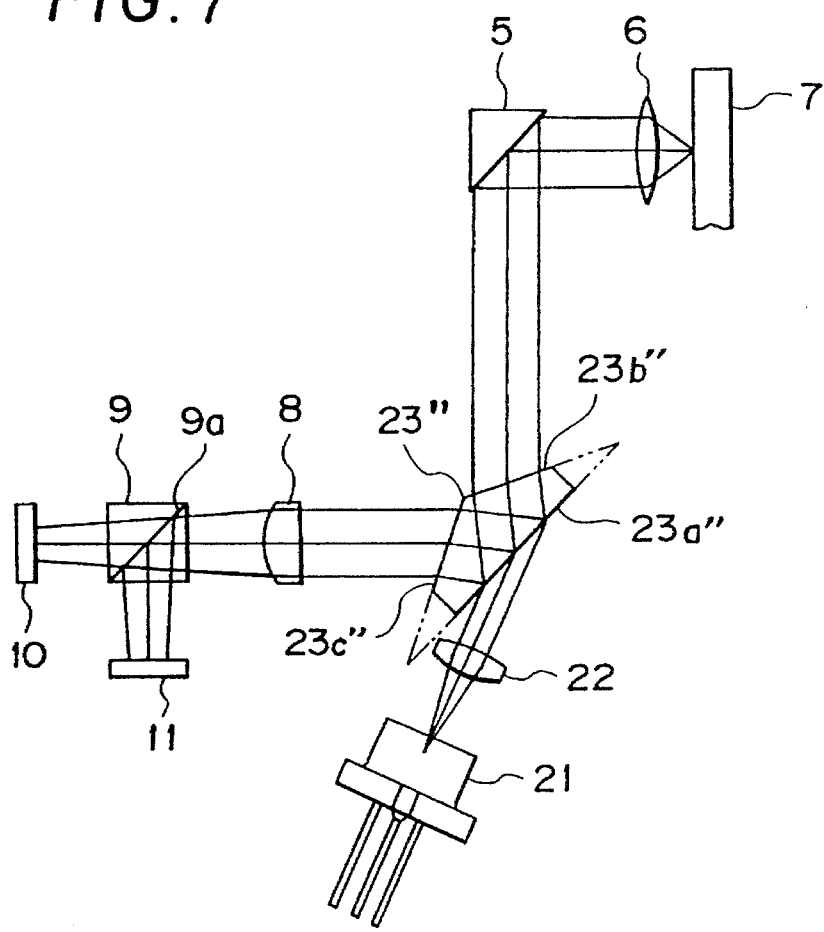
FIG. 7 is a schematic view illustrating a key section of an optical pickup device according to a still different embodiment of the present invention.
Figure 8:
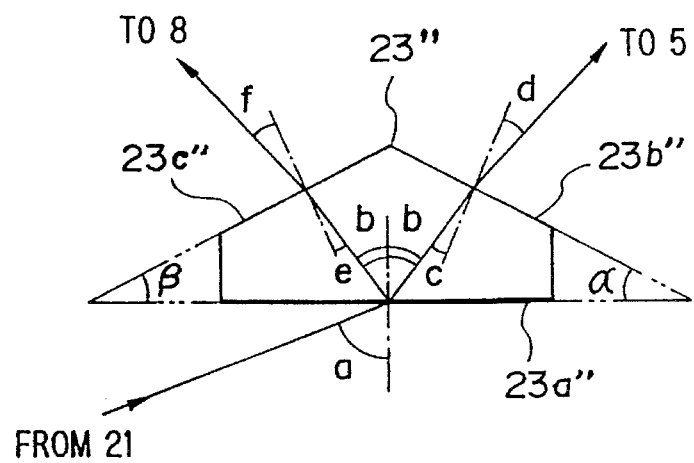
FIG. 8 is a schematic view illustrating a multi-functional prism in FIG. 7.

FIG. 7 and FIG. 8 are views each illustrating a key section of an optical pickup device according to a still another embodiment of the present invention. It should be noted that the same symbols are assigned to sections which are identical or equivalent to those in FIG. 1 and FIG. 4.

In this embodiment, the multi-functional prism 23" has a cross section obtained by modifying that of the multi-functional prism 23 shown in FIG. 4 to an isosceles triangle with the face 23a" (corresponding to the face 23 of the multi-functional prism 23) as a bottom edge and with a section where a light flux does not pass through cut off. For this reason, in this case the angle α between the face 23a" and the face 23b" of the multi-functional prism 23" is equal to the angle β between the face 23a" and the face 23c".

Also, assuming that a wavelength of laser light outputted from the semiconductor laser chip 21 is 780 (nanometers), and an index of refraction of the multi-functional prism 23" is 1.511, the incidence angle a is 70°, and α as well as β is 26.05°.

In this case, as a cross section of the multi-functional prism 23" is an isosceles triangle, production cost of the multi-functional prism 23" can be reduced. Also as an angle between the incoming light flux and the outgoing light flux in the multi-functional prism 23 is less than 90°, influence by flare light can be removed.

Figure 9:
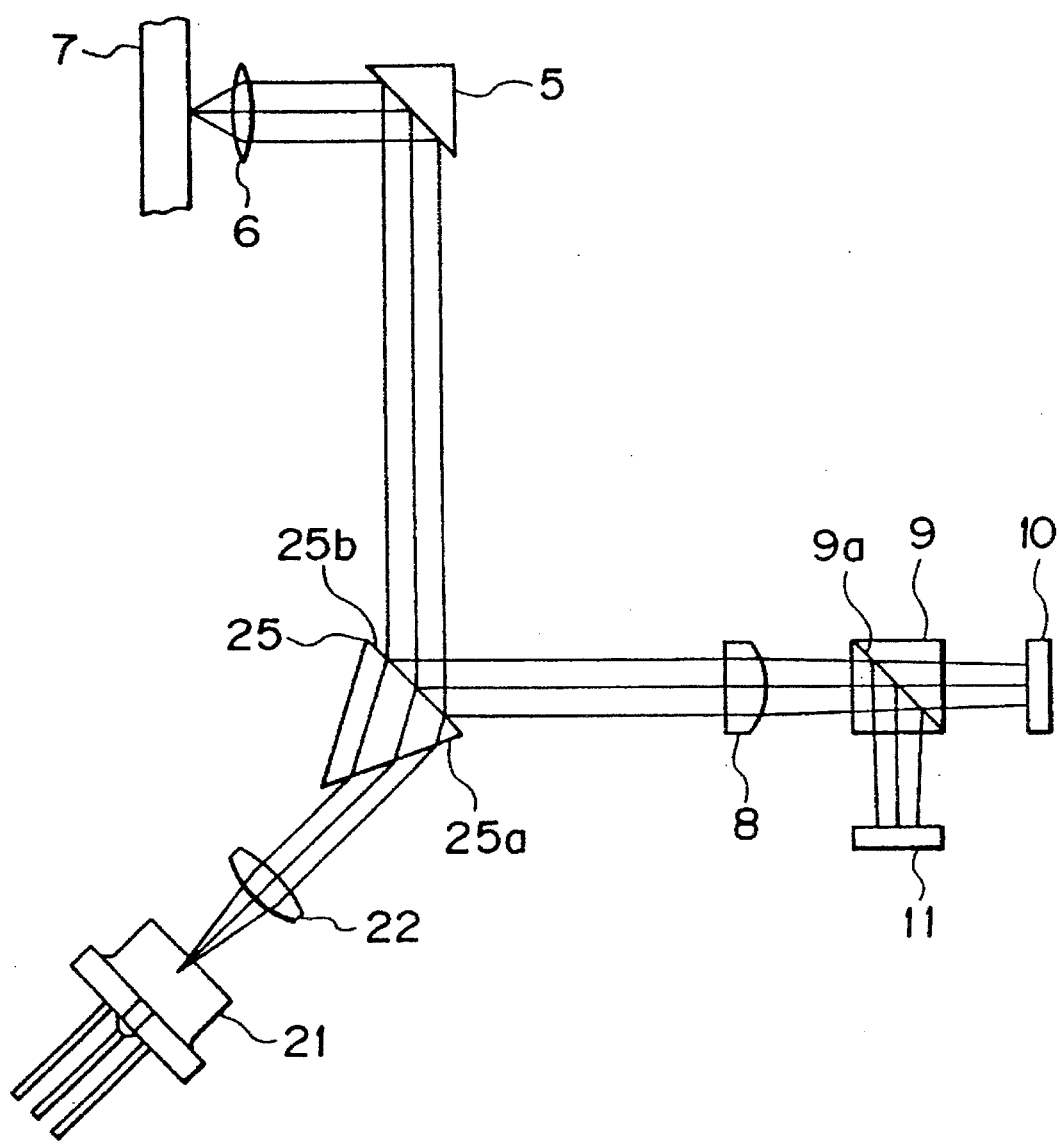
FIG. 9 is a schematic view illustrating a key section of an optical system in an optical pickup system according to other embodiment of the present invention.

FIG. 9 is a view illustrating a key section of an optical system according to another embodiment of the present invention. It should be noted that the same symbols are assigned to sections which are identical or equivalent to those in FIG. 1.

In this figure, the laser light outputted from the semiconductor laser chip 21 is converted to parallel light by the coupling lens 22, introduced on the face 25a of the multi-functional prism 25, refracted on this face 25a, and subjected to beam shaping effect when refracted, thus the cross section being shaped to a substantially circular one.

Then the light subjected to beam shaping goes out from the face 25b of the multi-functional prism 25, and is deflected by the deflection prism 5, guided to the object lens 6, and focused by the object lens 6 onto the optical recording medium 7.

The reflected light from the optical recording medium is converted to substantially parallel light by the object lens 6, then reflected by the deflection prism 5, furthermore reflected on the face 25b of the multi-functional prism 25, and guided to the light detection system.

Figure 10:
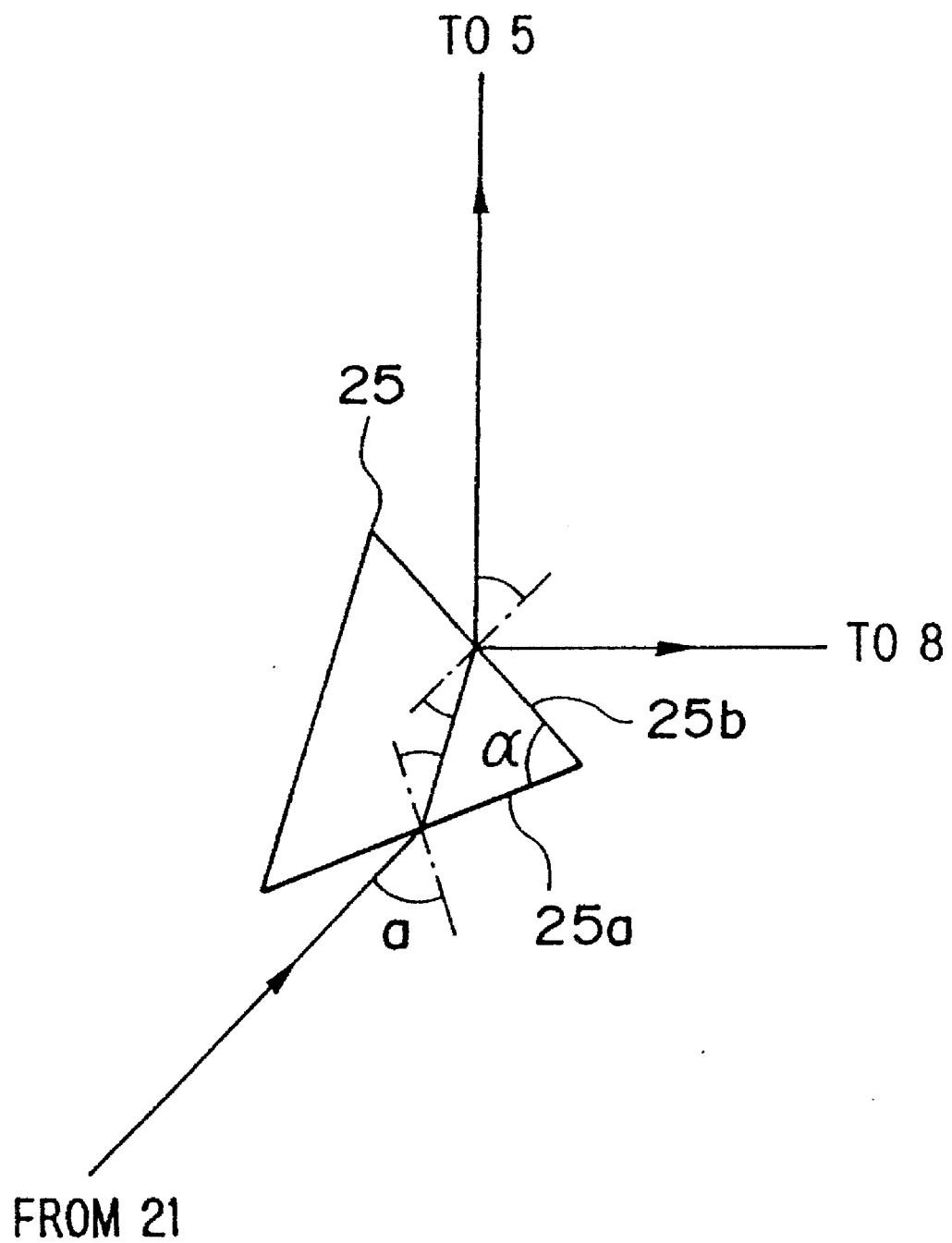
FIG. 10 is a schematic view illustrating a multi-functional prism shown in FIG. 9.

Herein, assuming that the incidence angle to the face 25a is a and the angle between the face 25a and face 25b is α as shown in FIG. 10, there is a relation as expressed by the following expression (5).

$$\left| \sin^{-1}\left(\frac{\sin a}{n}\right) \right| + \left| \sin^{-1}\left(\frac{\sin 45°}{n}\right) \right| - \alpha \quad (5)$$

Also when a photoeletromagnetic disk is used as the recording medium 7, it is preferable to form a multi-layered film with the p polarized light transmission factor of 70%, reflection factor of 30%, and reflection factor of s polarized light of 100%.

Thus in this embodiment, the reflection from the optical recording medium 7 is reflected on the face 25b of the multi-functional prism 25 and guided to a light detection system, so that the reflected light does not pass through the multi-functional prism 25 and as a result it is possible to prevent a quantity of light from decreasing.

It should be noted that the present invention can similarly be applied also when an optical recording medium other than an photoelectromagnetic disk such as, for instance, an additional write type of optical disk is used.

Figure 11:
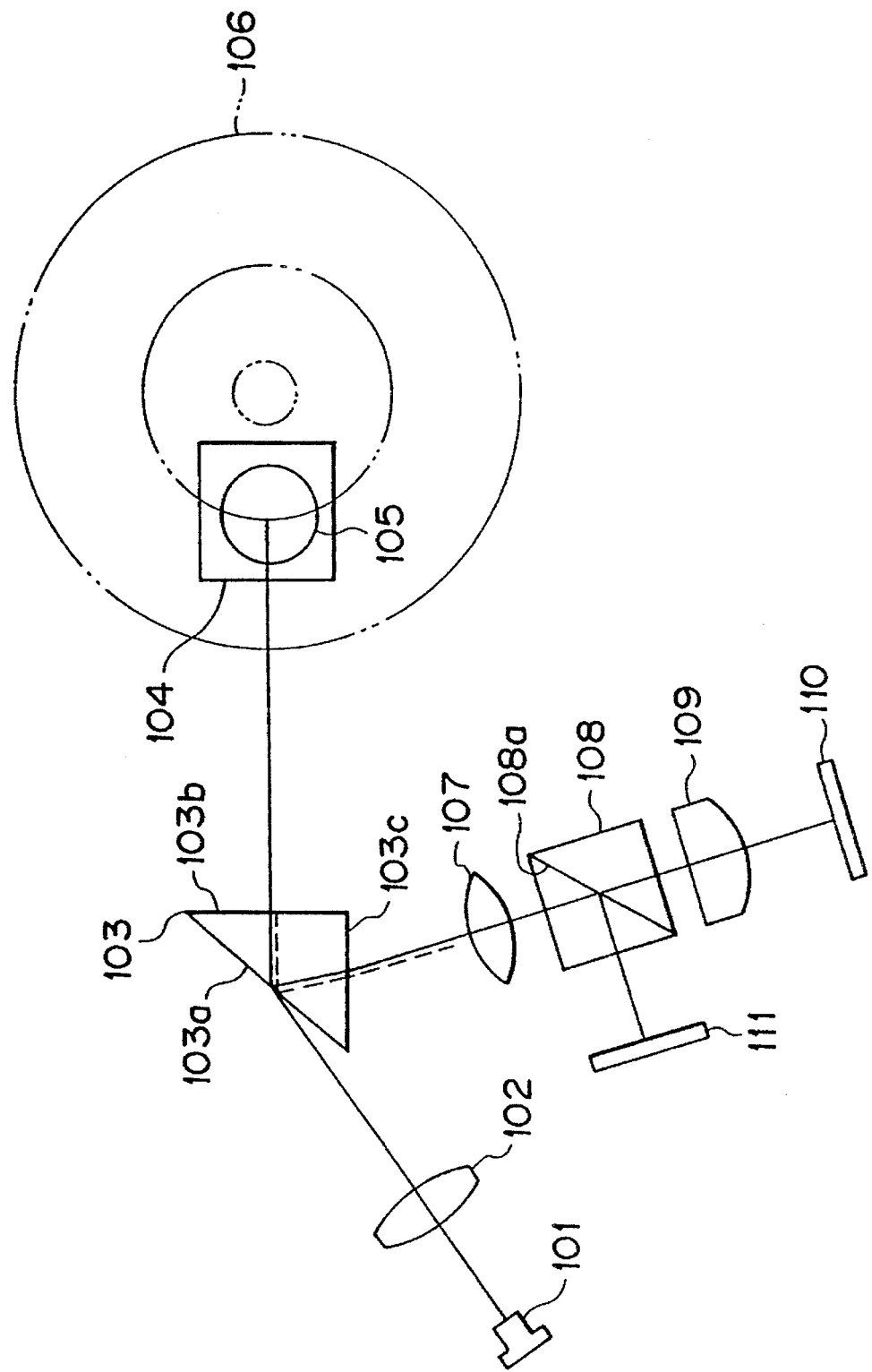
FIG. 11 is a schematic view illustrating a key section of an optical system in another optical pickup device in which a multi-functional prism is applied.

FIG. 11 is a view illustrating a key section of an optical system in other optical pickup device in which the multi-functional prism described above is used. It should be noted that, in this case, a focusing error is detected by used the known astigmatism method.

In this figure, the laser light outputted from the semiconductor chip 101 is converted by the coupling lens 102 to parallel light, introduced into the face 103a for light separation of the prism 103, and refracted on this face 103a with the beam form shaped to a substantially circular form. Then laser light subjected to beam shaping goes out from the face 103b of the prism 103, and is deflected by the deflection prism 104, guided to the object lens 105, and focused onto the optical recording medium 106 by the object lens 105.

The reflected light from the optical recording medium 106 is converted to substantially parallel light by the object lens 105, reflected by the deflection prism 104, introduced into the face 103b of the prism 103, and goes forward inside the prism 103, and is reflected on the face 103a for light separation of the prism 103, and again goes forward inside the prism 103, goes out from another face 103c of the prism 103, and is guided to the light detection system. In this case, accordingly, the prism 103 works as a multi-functional prism.

In this light detection system, the reflected light from the optical recording medium 106 is focused onto the focusing lens 107, then introduced into the beam splitter 108, and a portion of the light flux which passed through the face 108a for light separation of the beam splitter 108 passes through a cylindrical lens 109 and is received by a quartering light receiving element 110, and other portion of the light flux reflected on the face 109a for light separation is received by a dichotomizing light receiving chip 111.

Then a focusing error signal is formed depending on a difference between sums of light receiving signals from specified light receiving faces of the quartering light receiving element 110, and a tracking error signal is formed depending on a difference between light receiving signals from the two light receiving faces of the dichotomizing light receiving element 111. Also a regenerating signal from a preformat area of the optical recording medium 106 or a data signal recorded in a user area is formed on the basis of the total of receiving signals from four light receiving faces of the quartering light receiving element 110 or a sum of light receiving signals from two light receiving signals of the dichotomizing light receiving element 112.

By the way, in this case, a major portion of the light flux coming in from the face 103a for light separation of the prism 103 goes out from the face 103b, but a portion of the light flux is reflected on this face 103b. Herein the light flux is irradiated at right angles to this face 103b, so the reflected light flux (called internally reflected light flux) follows the same path as the reflected light from the optical recording medium 106 as shown in FIG. 11, and goes into the light detection system.

Thus as the internally reflected light flux is introduced into the quartering light receiving element 110 and the dichotomizing light receiving element 111 as external disturbance light, the offset component is overlapped the focusing error signal or the tracking error signal, and as a result an error disadvantageously occurs in focusing servo control or (and) in tracking servo control.

Figure 12:
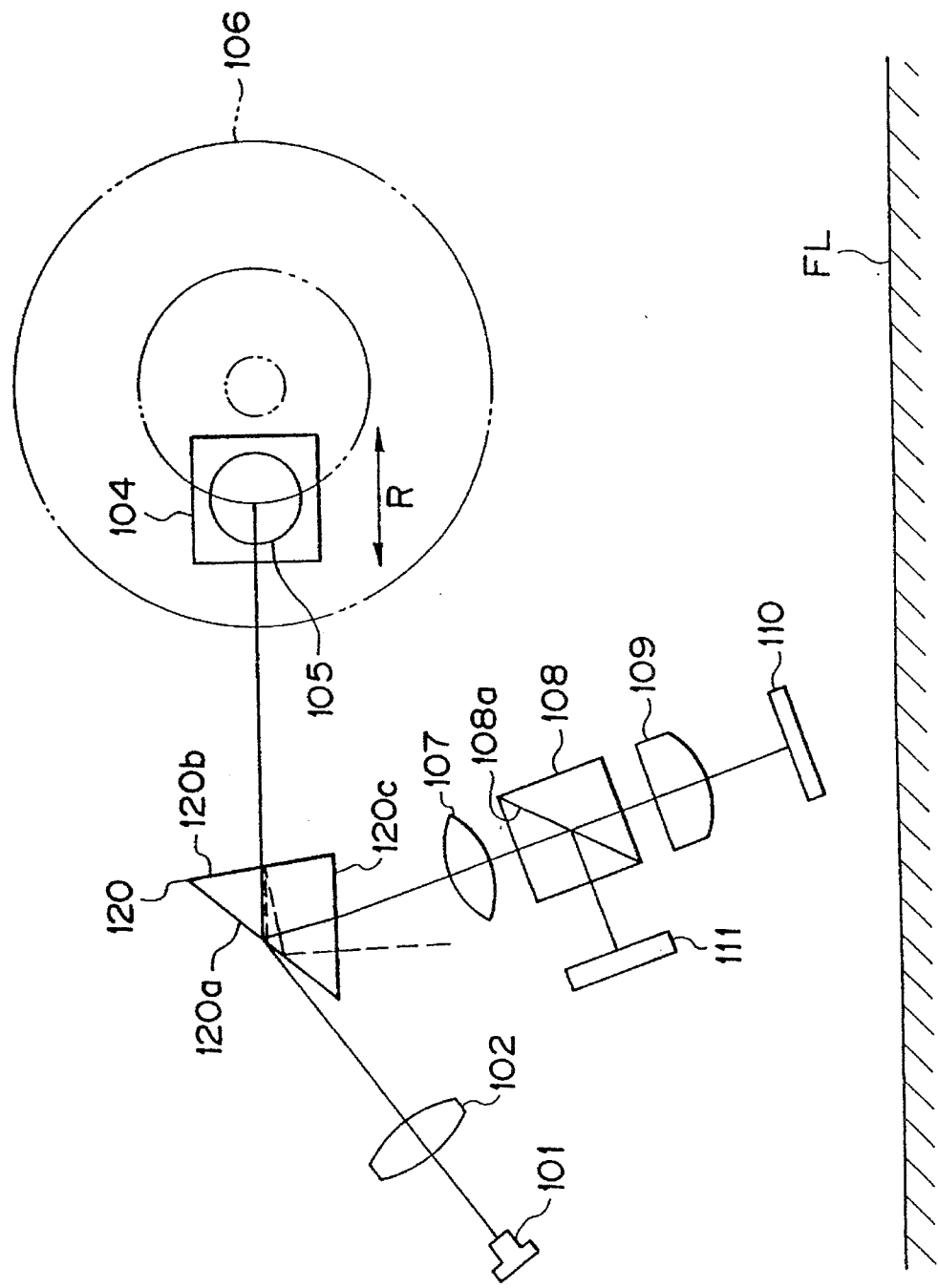
FIG. 12 is a schematic view illustrating a key section of an optical system in an optical pickup device according to still another embodiment of the present invention.

FIG. 12 is a view illustrating an optical system of an optical pickup device according to a different embodiment of the present invention which can eliminate the trouble as described above. It should be noted that the same symbols are assigned to sections which are identical or equivalent to those in FIG. 11.

In this figure, the laser light outputted from the semiconductor laser chip 101 is converted to parallel light by the coupling lens 102, goes into the face 120a for light separation of the prism 120, and is refracted on this face 120a for light separation with the beam form shaped to a substantially circular form. Then the laser light subjected to beam shaping goes out from the face 120b of the prism 120, and is deflected by the deflection prism 104, guided to the object lens 105, and focused by the object lens 105 onto the optical recording medium 106.

The reflected light from the optical recording medium 106 is converted to substantially parallel light by the object lens 105, reflected on the deflection prism 104, and goes into the face 120b of the prism 120, goes forward inside the prism 120, and is reflected on the face 120a for light separation of the prism 120, goes out from another face 120c of the prism 120 and is guided to the light detection system.

Figure 13:
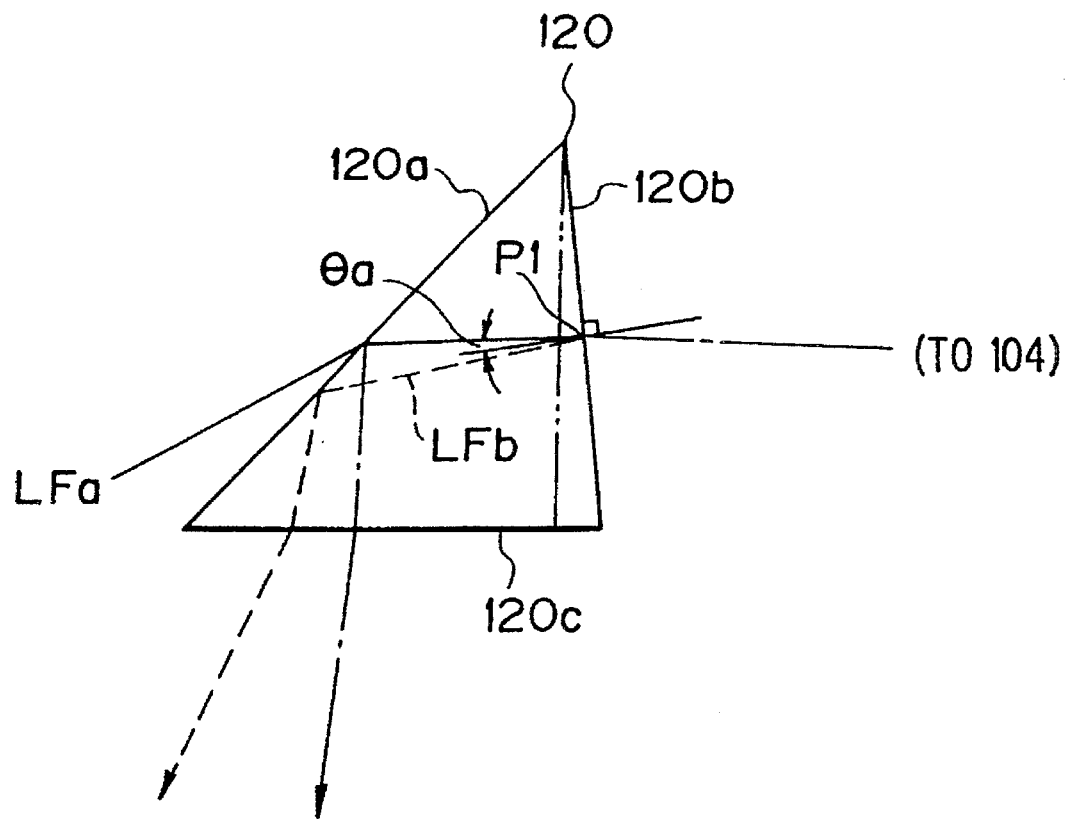
FIG. 13 is a schematic view illustrating detailed configuration of a prism.

Herein, as shown in FIG. 13, a major portion of the light flux θ a introduced from the face 120a for light separation of the prims 120 goes out from the face 120b, but a portion of the light flux is reflected on this face 120b.

The prism 120 is formed so that the light flux LFa will go to this face 120b at an angle displaced by angle LFa from the right angle. For this reason, of the light flux LFa, the internally reflected light flux LFb reflected on the face 120b advances, as shown by a broken line in the figure, at the incidence point P1 to the face 120b in the direction at angle 2 θ a with the normal of the face 120b.

On the other hand, the reflected light flux from the optical recording medium 106 follows the original light path inside the prism 120, so that the signal light flux and the internally reflected light flux LFb follow a different light path respectively inside the prism 120.

For this reason, the signal light flux and the internally reflected light flux LFb go out from the face 120c of the prism 120 at different outgoing points in the different directions.

With this feature, the internally reflected light flux LFb does not go into the light detection system, so that superposition of an offset component on a focusing error signal or a tracking error signal due to the internally reflected light flux is prevented, and as a result it becomes possible to execute focusing servo control and tracking servo control precisely.

Of the optical systems in the optical pickup devices shown in Fig.12, the semiconductor laser chip 101, coupling lens 102, prism 120, focusing lens 107, beam splitter 108, cylindrical lens 109, quartering light receiving chip 110, and dichotomizing light receiving element 111 are accommodated in a fixed frame (not shown) fixed to a frame member FL of an optical disk driving unit, while the deflection prism 104, object lens 105, and an object lens 105 moving mechanism (not shown) which moves this object lens 105 in the focusing direction as well as in the tracking direction are accommodated in a movable frame (not shown).

Then the movable frame is reciprocally moved by a seek mechanism not shown herein in the seek direction R parallel to the radial direction of the optical recording medium 106.

Herein the seek direction R is set so that the direction is identical to a direction parallel to the frame member FL, and with this feature a range of movement for the movable frame is minimized, which in turn makes it possible to minimize a frame of the optical disk driving device.

Figure 14:
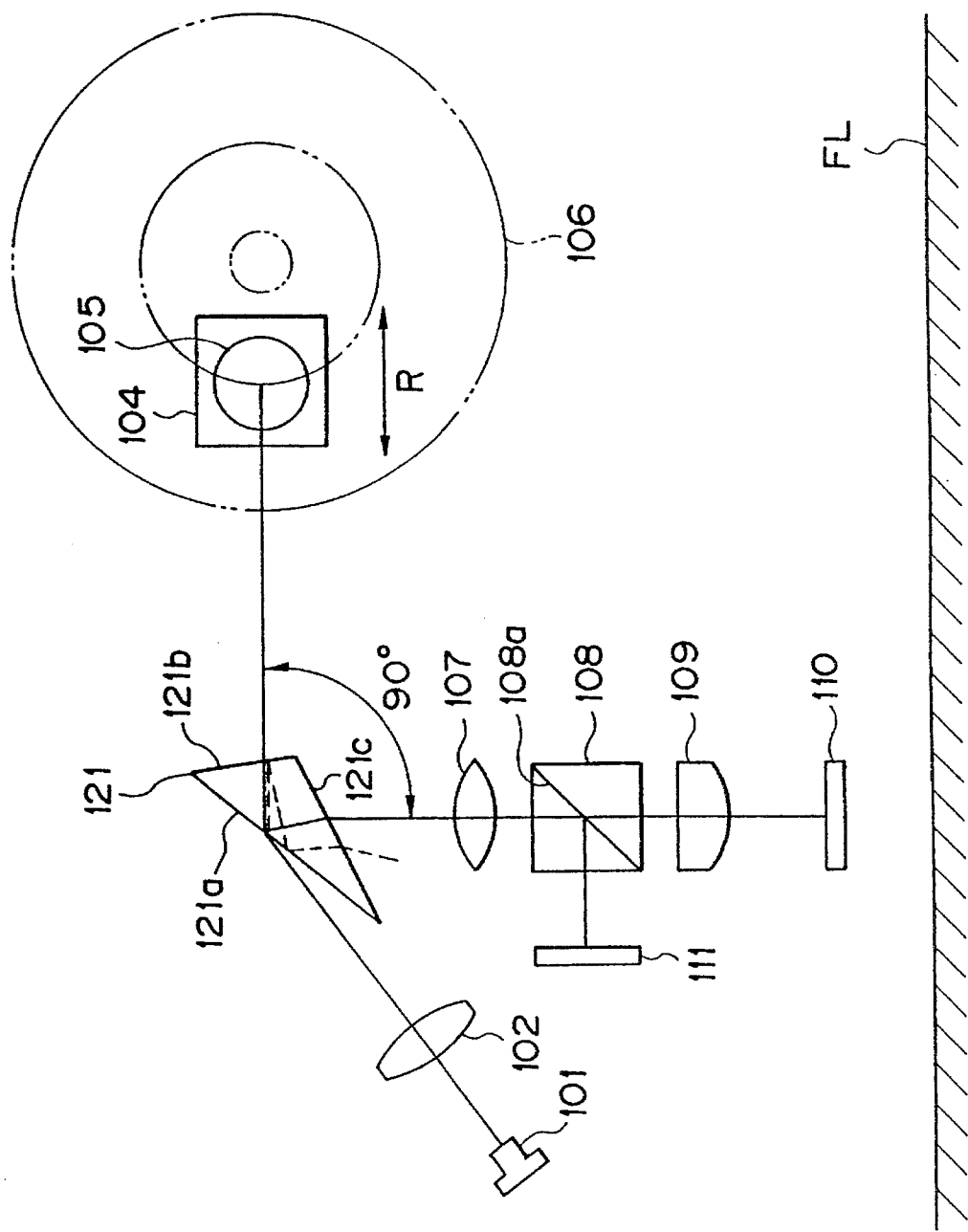
FIG. 14 is a schematic view illustrating a key section of an optical system in an optical pickup device according to a different embodiment of the present invention.

FIG. 14 shows a key section of an optical system in an optical pickup device according to still another embodiment of the present invention. It should be noted that the same symbols are assigned to sections which are identical or equivalent to those in FIG. 12.

In this figure, the laser light outputted from the semiconductor laser chip 101 is converted to parallel light by the coupling lens 102, goes to the face 121a for light separation of the prism 121, and is refracted on this face 121a for light separation with the beam form shaped to a substantially circular form. And the laser light subjected to beam shaping goes out from the face 121b of the prism 121, and is deflected by the deflection prism 104, guided to the object lens 105, and focused to the optical recording medium 106 by the object lens 105.

The reflected light from the optical recording medium 106 is converted to substantially parallel light by the object lens 105 and then reflected by the deflection prism 104, goes into the face 121b of the prism 121, advances inside the prism 121, and is reflected on the face 121a for light separation of the prism 121, advances insides the prism 121, goes out from another face 121c of the prism 121, and is guided to the light detection system.

Herein, in this embodiment, angles between the face 121a, face 121b and face 121c all for light separation are set so that an angle between the optical axis of the light flux going out from the face 121b of the prism 121 to the deflection prism 104 and the optical axis of the light axis going out from the face 121c of the prism 121 to the light detection system is 90°.

Thus in this embodiment, the fix frame and the movable frame are disposed at right angles to each other, so that hey can be assembled easily.

Figure 15:
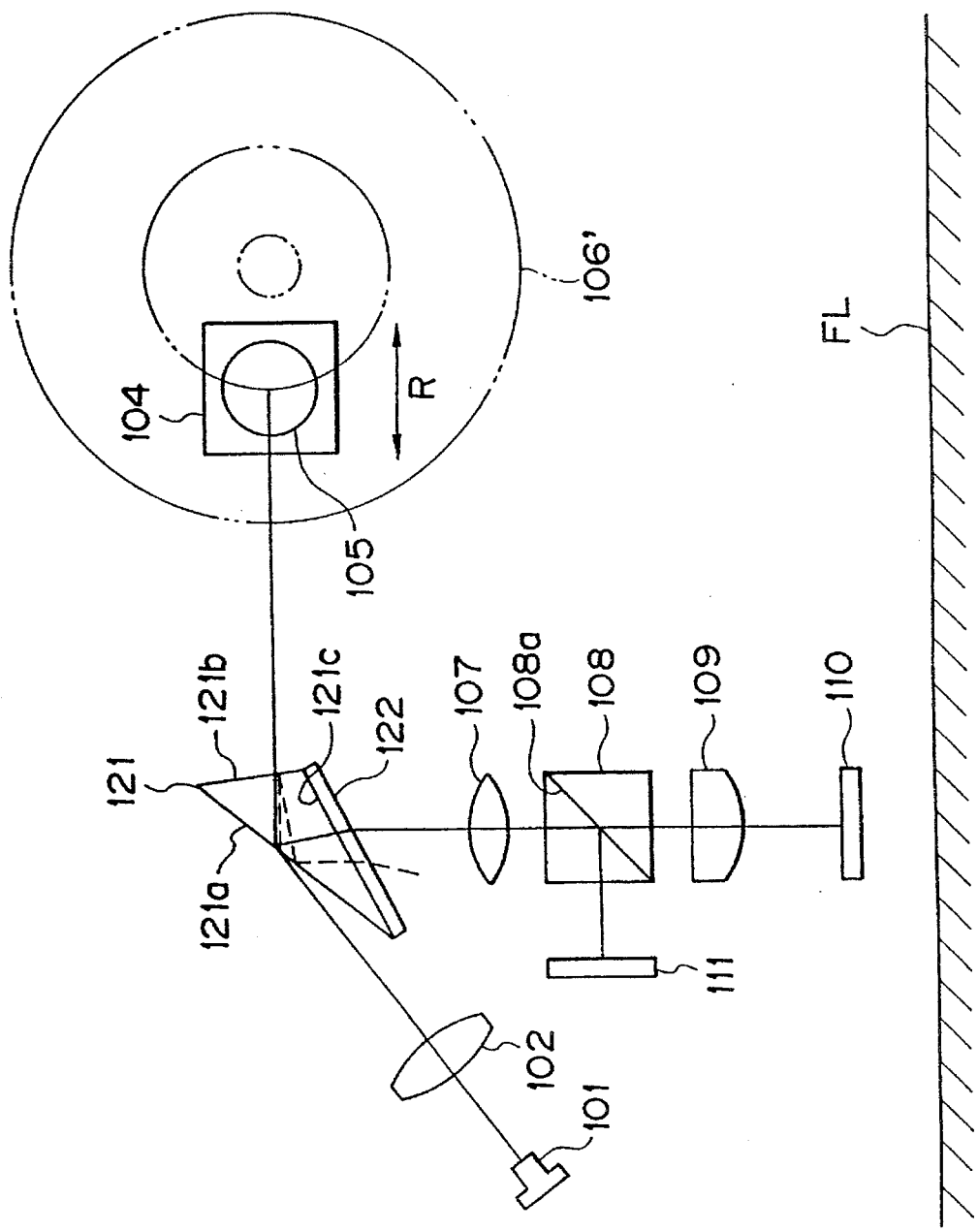
FIG. 15 is a schematic view illustrating a key section of an optical pickup device according to a further different embodiment of the present invention.

FIG. 15 is a view illustrating a key section of an optical system in an optical pickup device according to still further different embodiment of the present invention. It should be noted that, in this figure, the same symbols are assigned to sections which are identical or equivalent to those in FIG. 14.

In this embodiment, the photoelectromagnetic disk 106' is used as an optical recording medium, and a ½ wavelength plate 122 is adhered to the outer side of the face 121c of the prism 121.

With this feature, the light flux going out from the face 121c of the prism 121 passes through the ½ wavelength plate, and then the polarizing face is turned by 45°.

Also it should be noted that, in this case, if a film reflecting a portion of P polarized light and substantially all of S polarized light is formed as the face 121a for light separation of the prism 121, the S/N ratio of the photoelectromagnetic signal can be raised more.

Figure 16:
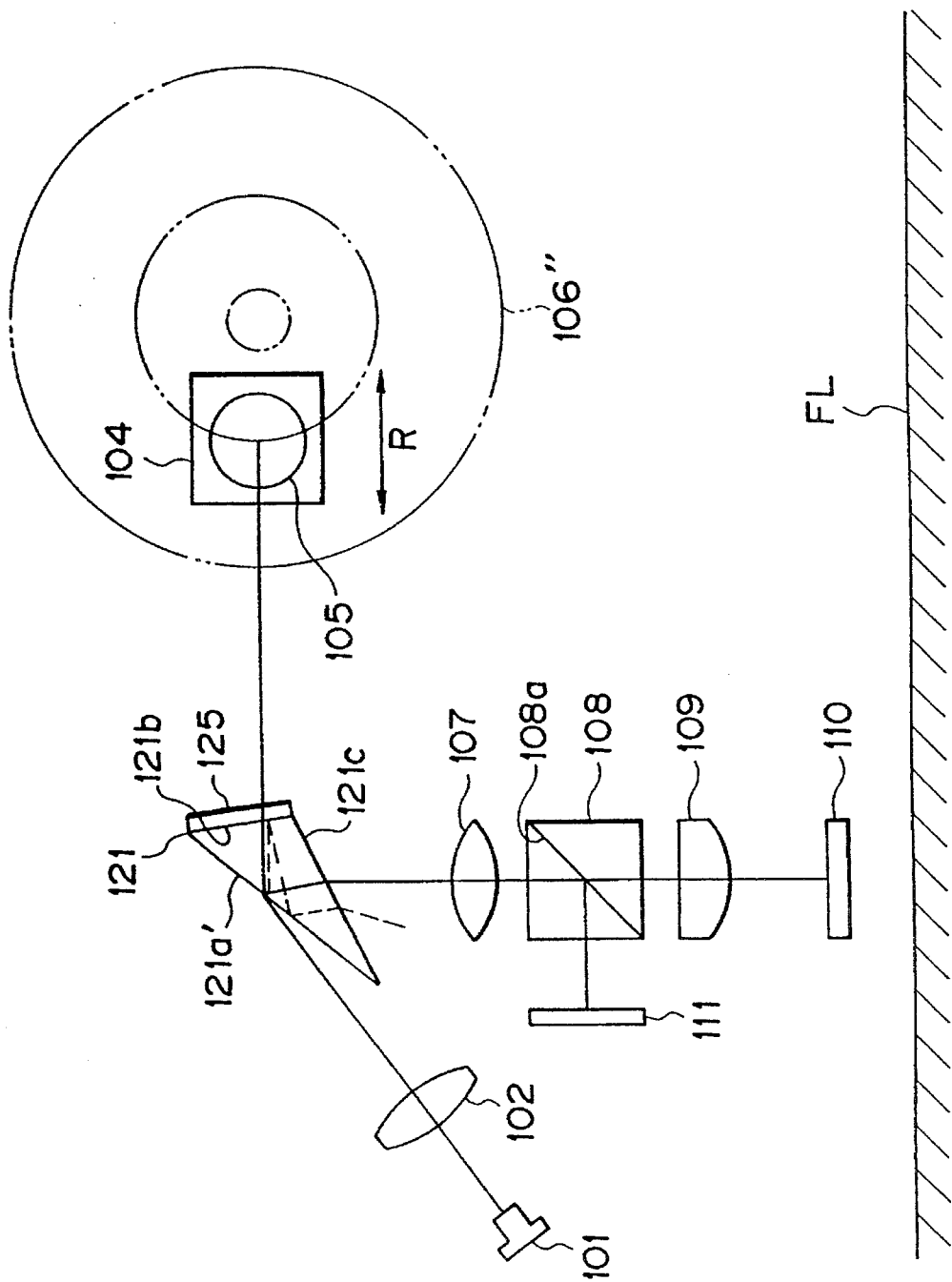
FIG. 16 is a schematic view illustrating a key section of an optical system in an optical pickup device according to still further different embodiment of the present invention.

FIG. 16 is a view illustrating a key section of an optical system in an optical pickup device according to still further different embodiment of the present invention. It should be noted that, in this figure, the same symbols are assigned to sections which are identical or equivalent to those in FIG. 14.

In this embodiment, the additional write type of optical disk 106" is used as an optical recording medium, the face 121a' for light separation of the prism 121 also functions as a polarized beam splitter face, and the ¼ wavelength plate 125 is adhered to outer side of the face 121b.

For this reason the signal light outputted from the semi-conductor laser chip 101 is converted to parallel light by the coupling lens 102, goes into the face 121a' for light separation of the prism 121 as P polarized light, and this P polarized signal light passes through the face 121a' for light separation, advances inside the prism 121, and goes out from the face 121b.

The signal lights going out from the face 121b passes through the ¼ wavelength plate 125, and is converted to circular polarized light by the ¼ wavelength plate 125, deflected by the deflection prism 104, and focused by the object lens 105, thus an image being formed on a recording face of the additional write type of optical disk 106".

The reflected light from the additional type of optical disk 106" is converted to substantially parallel light by the object lens 105, reflected by the deflection prism 104, and again introduced into the ¼ wavelength plate 125. With this feature, the reflected light passing through the ¼ wavelength plate 125 has been converted to linear polarized light crossing the incidence light at right angles, so that the entire light flux is reflected on the face 121a' for light separation, advances inside the prism 121, goes out from the face 121c, and is guided to the light detection system.

Thus in this embodiment, the entire light flux of signal light can be utilized. It should be noted that, although the description above assumes the case where the present embodiment is applied to an additional write type of optical disk, the present embodiment can also be applied to a phase change type of optical disk similarly.

Figure 17:
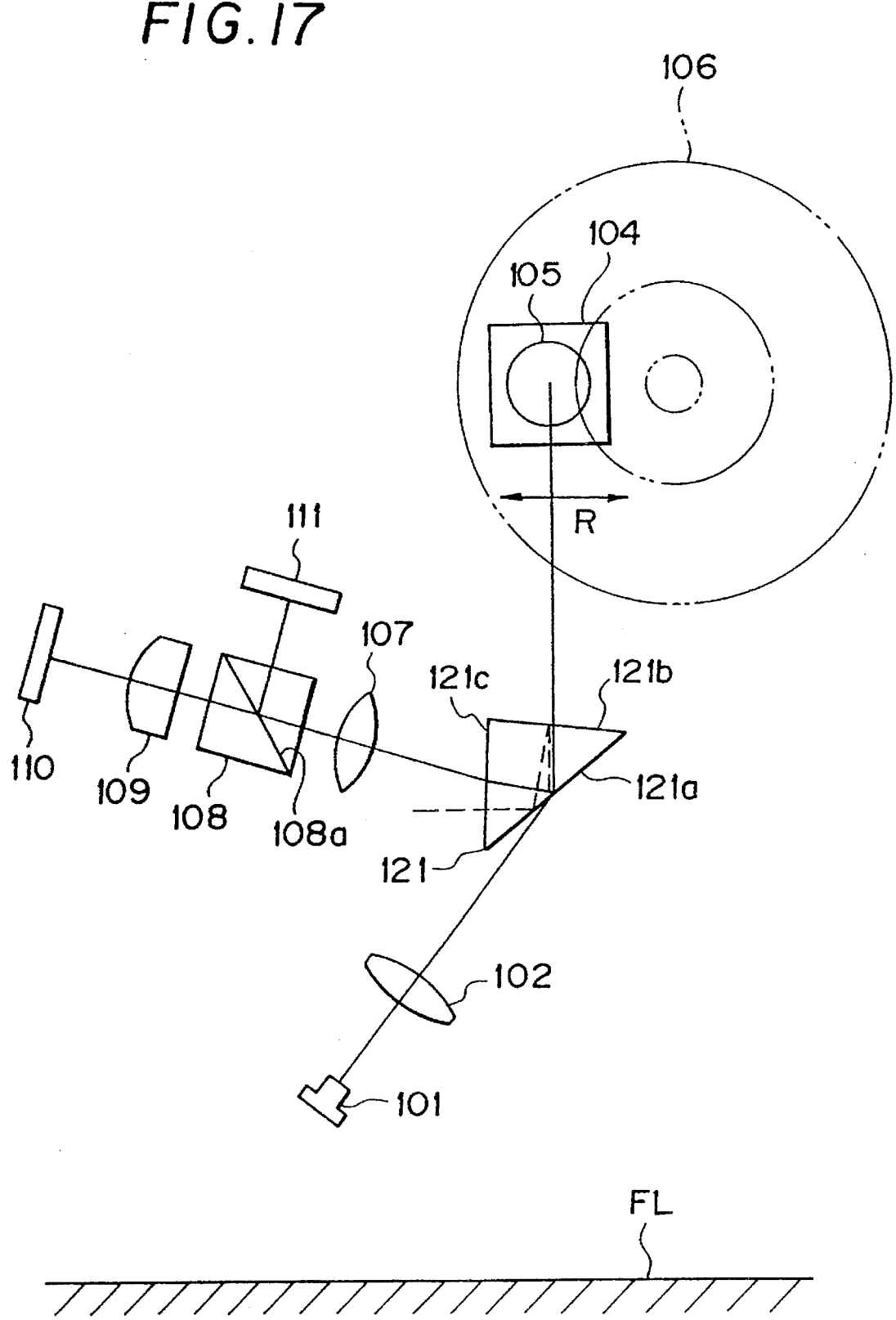
FIG. 17 is a schematic view illustrating a key section of an optical pickup device according to a still furthermore different embodiment of the present invention.

FIG. 17 is a view illustrating a key section of an optical system in an optical pickup device according to still other different embodiment of the present invention. It should be noted that, in this figure, the same symbols are assigned to sections which are identical or equivalent to those in FIG. 12.

In this embodiment, all elements of the optical system in the optical pickup device and the object lens moving mechanism (not shown) which moves the object lens 105 in the focusing direction as well as in the tracking direction are accommodated in the same movable frame (not shown), and this movable frame is reciprocally moved in the seek direction R parallel to the radial direction of the optical recording medium 106.

Herein the seek direction R is set so that the direction is identical to a direction parallel to the frame member FL, and with this feature a range of movement of the movable frame is minimized, which in turn make it possible to minimize a frame of the optical disk drive unit.

Figure 18:
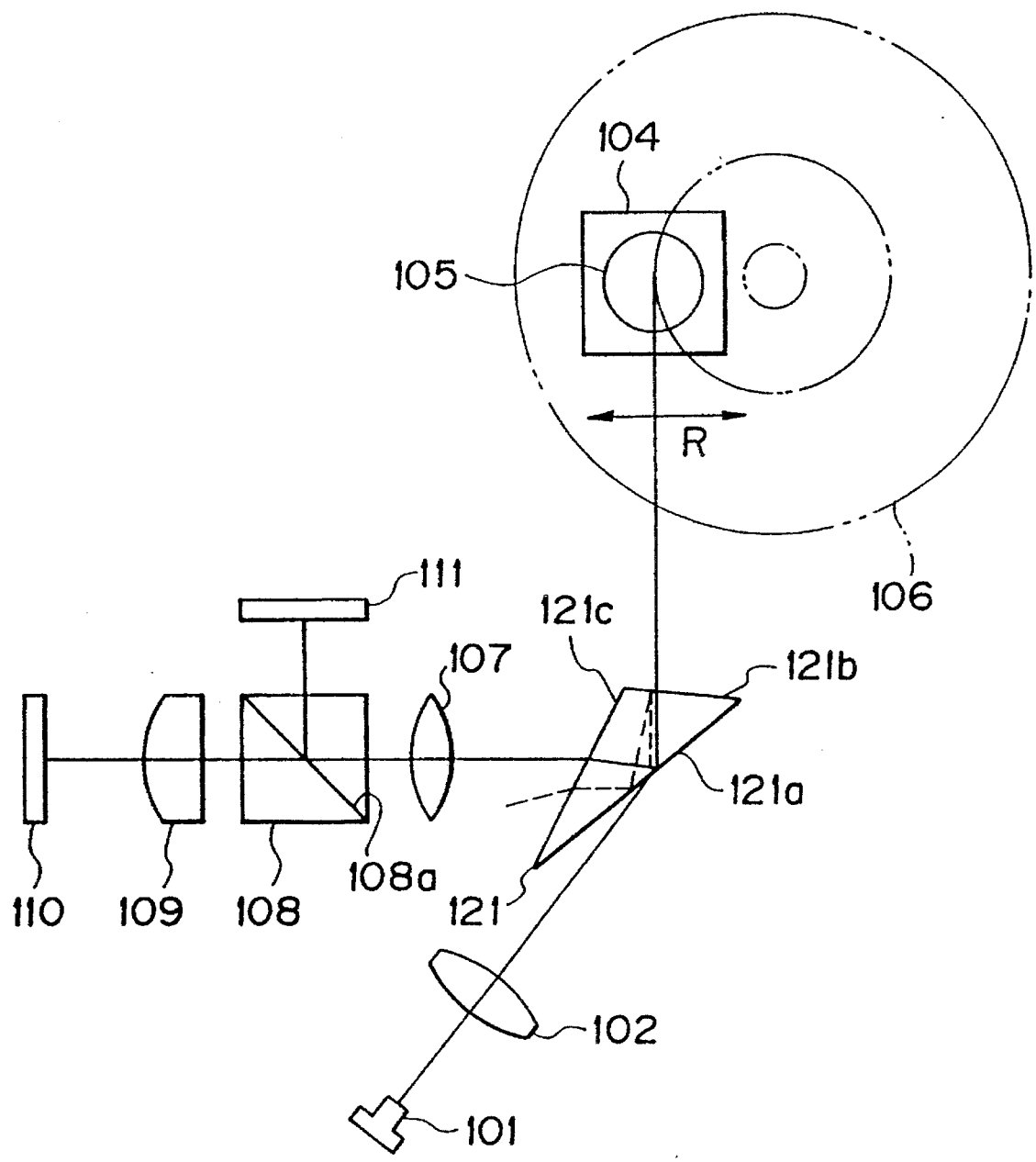
FIG. 18 is a schematic view illustrating a key section of an optical system in an optical pickup device according to still other different embodiment of the present invention.

FIG. 18 is a view illustrating a key section of an optical system in an optical pickup system according to still different embodiment of the present invention. It should be noted that, in this figure, the same symbols are assigned to sections which are identical or equivalent to those in FIG. 14.

In this embodiment, all elements of the optical system in the optical pickup device and the object lens moving mechanism (not shown) which moves the object lens 105 in the focusing direction as well as in the tracking direction are accommodated in the same movable frame (not shown), and this movable frame is reciprocally moved by a seek mechanism not shown herein in the seek direction R parallel to the radial direction of the optical recording medium 106.

Herein the seek direction R is set so that the direction is identical to a direction parallel to the frame member FL, and with this feature a movement range of the movable frame can be minimized, which in turn makes it possible to minimize a frame of the optical disk drive unit.

Figure 19:
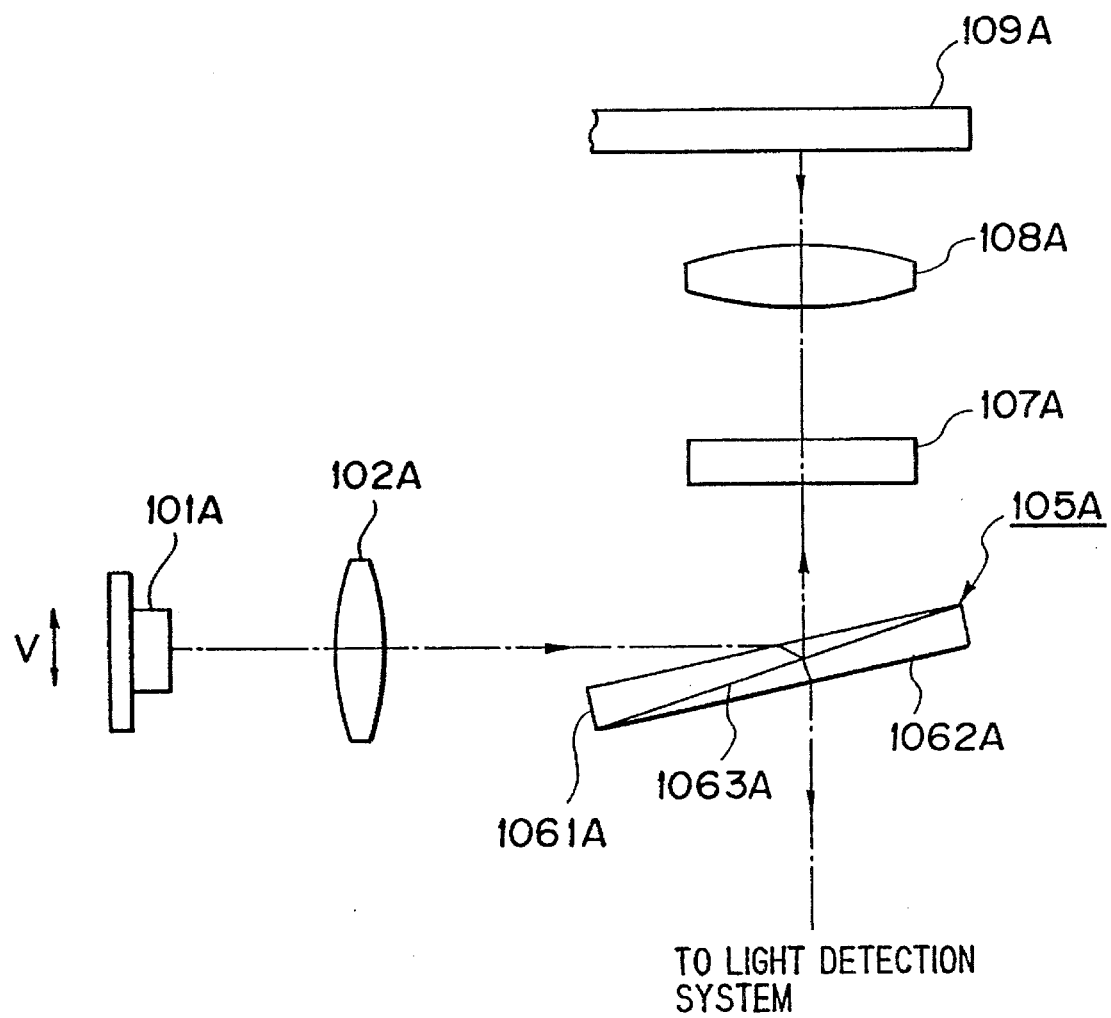
FIG. 19 is a schematic view illustrating a WORM type of optical pickup device according to still another embodiment of the present invention.

FIG. 19 is a view illustrating a WORM (Write Once Read Many) type of optical pickup device according to still other different embodiment of the present invention.

In this figure, the semiconductor 101A is fixed so that laser light goes out therefrom in one horizontal direction on the paper. It should be noted that an active layer of a chip in the semiconductor laser 101A is in the Y direction which is the vertical direction on the paper.

The coupling lens 102A and the optical element 106A are arranged in this order in the outgoing direction of the laser light from the semiconductor laser 101A. In the optical element 106A, 2 sheets of wedge-shaped prisms 1061A, 1062A having the same form are alternately placed on and jointed to each other, and a polarization film 1063A is formed on the function face. The polarization film 1063A transmits S polarized light and reflects P polarized light.

Above the optical element 106A are arranged the ¼ wavelength plate 107A, object lens 108A, and optical disk 109A in this order. Herein a punching recording type or a phase change type of optical disk can be used as the optical disk 109A.

Under the optical element 106A is provided a light detection system not shown herein.

Figure 20:
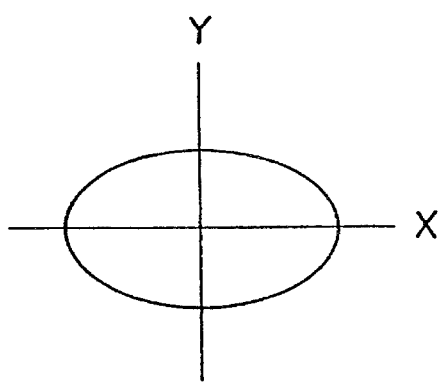
FIG. 20 is a view illustrating a form of a cross section of a light flux outgoing from a semiconductor laser.

In this configuration, laser light is irradiated from the semiconductor laser 101A. In this case, as shown in FIG. 20, an active layer of the chip is oriented in the direction Y in this figure, and a cross section of the outgoing light flux is oval which is narrow in the Y direction and wide in the X direction which is at right angle with the direction Y. Also the polarizing direction of the outgoing light is the same as the direction of the active layer of the chip, so in this figure P polarized laser light is irradiated.

The outgoing light passes through the coupling lens 102A and is converted to parallel light. It should be noted that the outer diameter of the coupling lens 102A is substantially larger than that of the outgoing light flux from the semiconductor laser 101A, and the entire light flux passes through the coupling lens 102A. The laser light converted to parallel light goes into the optical element 106A.

Figure 21:
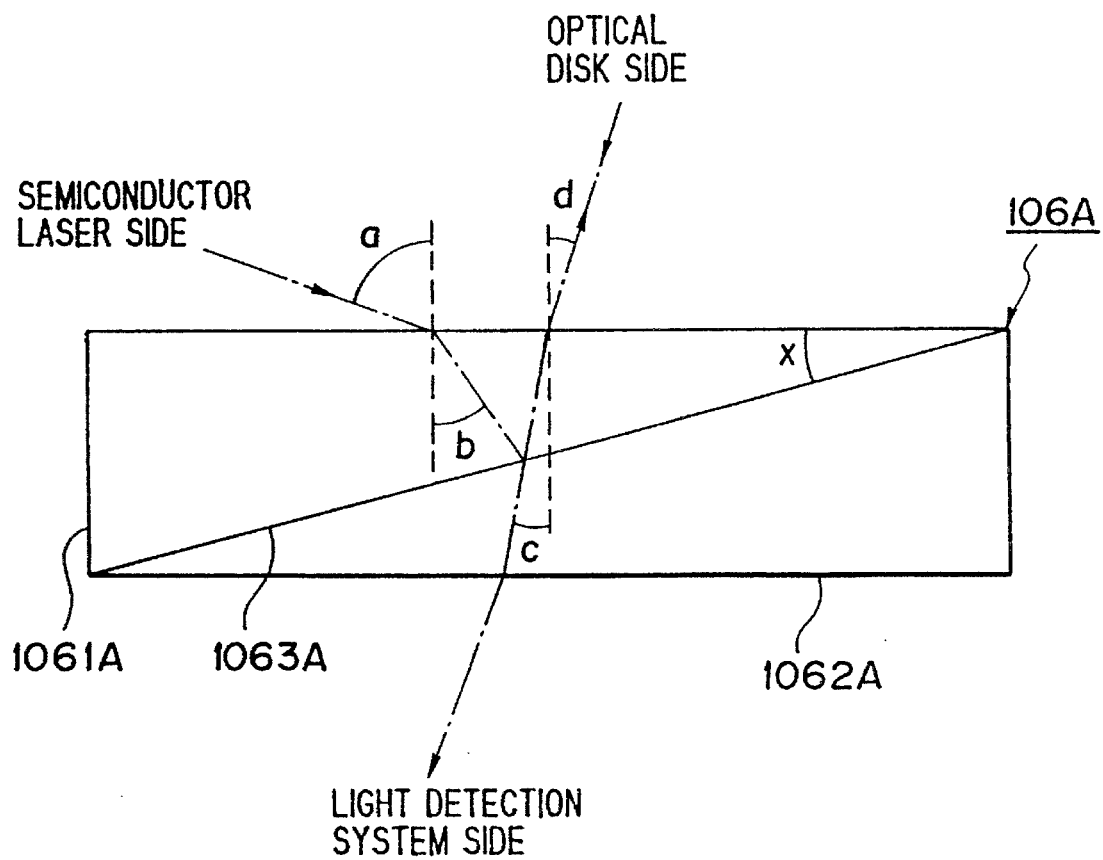
FIG. 21 is a view illustrating a path of a laser light passing through an optical element.

As shown in FIG. 21, the incidence light goes into the wedge-shaped prism 1061A and reaches the polarization film 1063A. The polarization film 1063A reflects the P polarized light coming in from the semiconductor laser chip 101A side. The reflected light advances inside the wedge-shaped prism 1061A and goes out to outside. In this case, the above-described P polarized light is refracted when going into the wedge-shaped prism 1061A and when going out from the wedge-shaped prism 1061A.

Figure 22:
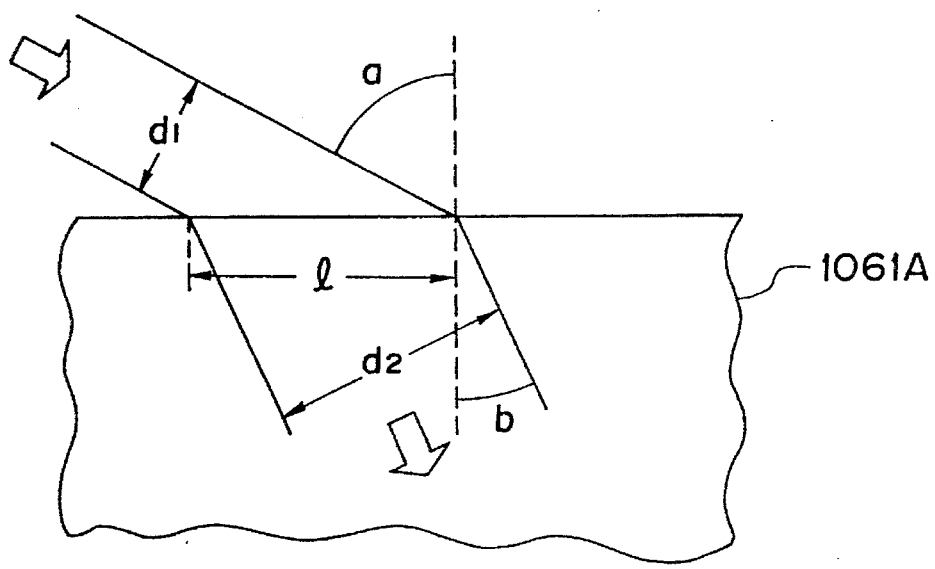
FIG. 22 is a view illustrating change in width of a light flux due to refraction.

Now assuming that a Y-directional width of the light flux coming into the wedge-shaped prism 1061A is $d_1$ as shown in FIG. 22, the width is widened to $d_2$ when the light flux goes into the wedge-shaped prism 1061A. Namely, a width of the light flux becomes larger only in the Y-direction.

Herein assuming that the incidence angle when the incoming light described above comes into the wedge-shaped prism 1061A is a, the angle of refraction b, and a width occupied by the light flux on a surface of the wedge-shaped prism 1061A l, the light flux width d1 and light flux width d2 can be expressed as follows;

$$d1 = l \cdot (\cos(a))$$

$$d2 = l \cdot (\cos(b))$$

In this case, the magnification m1 in beam shaping is expressed as follows;

$$m1 = d2/d1 = (\cos(b))/(\cos(a))$$

A light flux width of the laser light which went into the wedge-shaped prism 1061A changes also when the laser light goes out of the wedge-shaped prism 1061A. Herein assuming that the incidence angle when going out from the wedge-shaped prism 1061A is c, and the angle of refraction is d, magnification m2 in beam shaping is expressed as follows;

$$m2 = (\cos(d))/(\cos(c))$$

For this reason, the combined beam shaping magnification m0 obtained by multiplying the above two values can be expressed by the following expression (I).

$$m0 = m1 \cdot m2 = ((\cos(b))/\cos(a)) \cdot ((\cos(d)/\cos(c)) \qquad (I)$$

Namely the Y-directional width of the light irradiated from the semiconductor laser 101A is enlarged by m0 times after the light passes through the optical element 106A. With this, the oval light flux irradiated from the semiconductor laser 101A is shaped to a circular one.

On the other hand, in this embodiment, the optical axis of the incidence light from the semiconductor laser 101A to the optical element 106A crosses the optical axis of the outgoing light from the optical element 106A to the optical disk 109A at right angles. There is a relation between the above incidence angle a and the angle of refraction d as expressed by the following expression;

$$a + d = 90 (degrees)$$

Herein assuming that the index of refraction of the material for the wedge-shaped prism 1061A as well as for the wedge-shaped prism 1062A is n and the vertical angle is x, there is a relation as expressed by the following expression (II);

$$\cos(a) = n \cdot \sin(arc \sin(\sin(a))/n) - 2 \cdot x) \qquad (II)$$

Next description is made for a concrete example of the optical element 106A. It is assumed that the wedge-shaped prisms 1061A and 1062A are formed, for instance, with the known glass material of "BK-7". The index of refraction of this glass material is 1.511 for a wavelength of 780 (nanometers). If it is assumed that the vertical angle x of each of the wedge-shaped prisms 1061A and 1062A is 14.5 degrees and the incidence angle a of the laser light is set to 73.97 degrees, then the angle of refraction b is 39.5 degrees, the incidence angle c is 10.5 degrees, and the angle of refraction d is 15.98 degrees. In this case, the beam shaping magnification m0 is 2.73. Also a sum of the incidence angle a and the angle of refraction d is 89.95 degrees, and the optical axis of the incidence light to the optical element 106A and the optical axis of the outgoing light cross each other at right angles.

The laser light shaped as described above is converted to circular polarized light by passing through the ¼ wavelength plate 107A. The laser light is focused by the object lens 108A and irradiated as a laser spot onto the optical disk 109A.

On the contrary, the reflected light from the optical disk 109A passes through the object lens 108A and the ¼ wavelength plate 107A. The reflected light is converted to polarized light when passing the ¼ wavelength plate 107A. The S polarized laser light goes into the optical element 106A.

The light polarization film 1063A transmits the laser light. The transmitted laser light passes through the optical element 106A and goes out to the outside. It should be noted that the incoming laser light is refracted when going into the wedge-shaped prism 1061A and when going out of the wedge-shaped prism 1062A respectively, but the respective direction of refraction is contrary to each other, but has the same angle. Also as the upper face and bottom face of the optical element 106A are parallel to each other, the incidence direction of the laser light coming into the optical element 106A is parallel to the direction of irradiation of the outgoing laser light from the optical element 106A. Then the laser light going out of the optical element 106A is introduced into light detection system.

The light detection system regenerates data recorded in the optical disk 109A, or detects displacement of a focus of a laser spot irradiated on the optical disk 109A or displacement in tracking. In this case, the recorded data is played back by detecting change in illuminance of the incidence light.

As described above, in this embodiment, one piece of optical element 106A has a function for beam shaping to shape an oval laser light flux coming in from the semiconductor laser 101A to a circular laser light flux and irradiate the shaped laser light to the optical disk 110A and a function for beam separation to irradiate a light flux returned from the optical disk 110A to a light detection system.

With this feature, a number of parts, two pieces of which have been required in an optical system, is reduced to one, and thus a number of parts required in an optical pickup device can be reduced.

Figure 27:
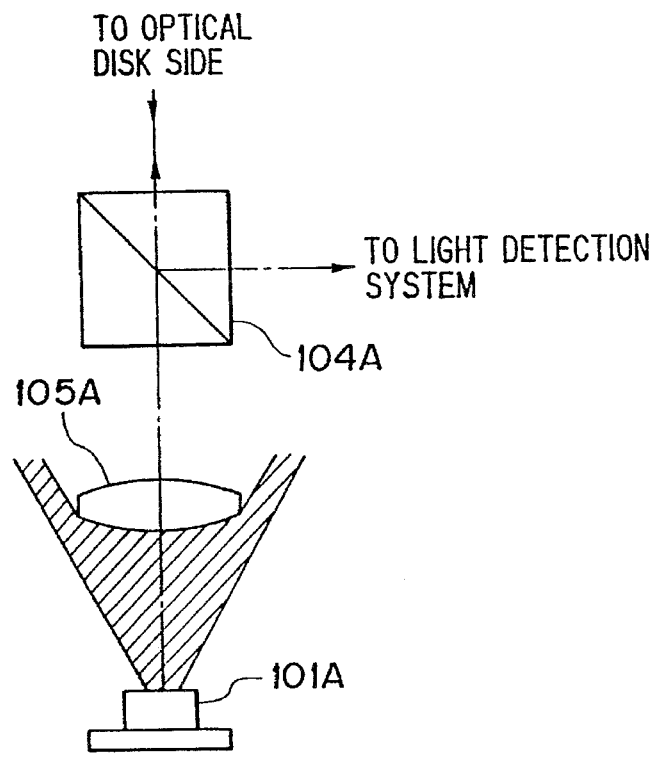
FIG. 27 is a view illustrating still another example of a conventional type of optical pickup device.

Also each light flux coming into the optical element 106A is irradiated as a whole in a specified direction, and an outer peripheral section of the light flux as described in relation to FIG. 27 is not cut off, so that outgoing irradiation from the semiconductor laser 101A can effectively be utilized.

Also the optical element 106A is formed by joining two pieces of wedge-shaped prism 1061A and 1062A and forming a light polarization film 1063A on the junction face, namely the configuration is very simple, so that the parts cost is low.

By the way, as shown in FIG. 27, when the outgoing light from the semiconductor 101A is vertically introduced onto an external face of the beam splitting element 104A, a portion of the light flux reflected on the external face is disadvantageously returned to the semiconductor laser 101A, but in this embodiment outgoing irradiation from the semiconductor laser 101A is introduced to the external face of the optical element 106A at an angle other than right angle, so that the light reflected on the external face never returns to the semiconductor laser 101A.

Furthermore the optical axis of the incidence light from the optical disk 109A to the optical element 106A is parallel to the optical axis of the outgoing light from the optical element 106A, while the optical axis of the incidence light from the semiconductor laser 101A to the optical element 106A is vertical to the above light axes.

When assembling an optical pickup device, various types of parts are assembled along an optical axis of a light path, but if a plurality of light axes are parallel or vertical to each other, a work to assemble parts can be performed very easily. Also usually the parts as described above are accommodated in a square box-type frame, but when a plurality of optical axes are parallel or vertical to each other, odd space in a frame can be reduced, which in turn makes it possible to minimize the frame.

Figure 23:
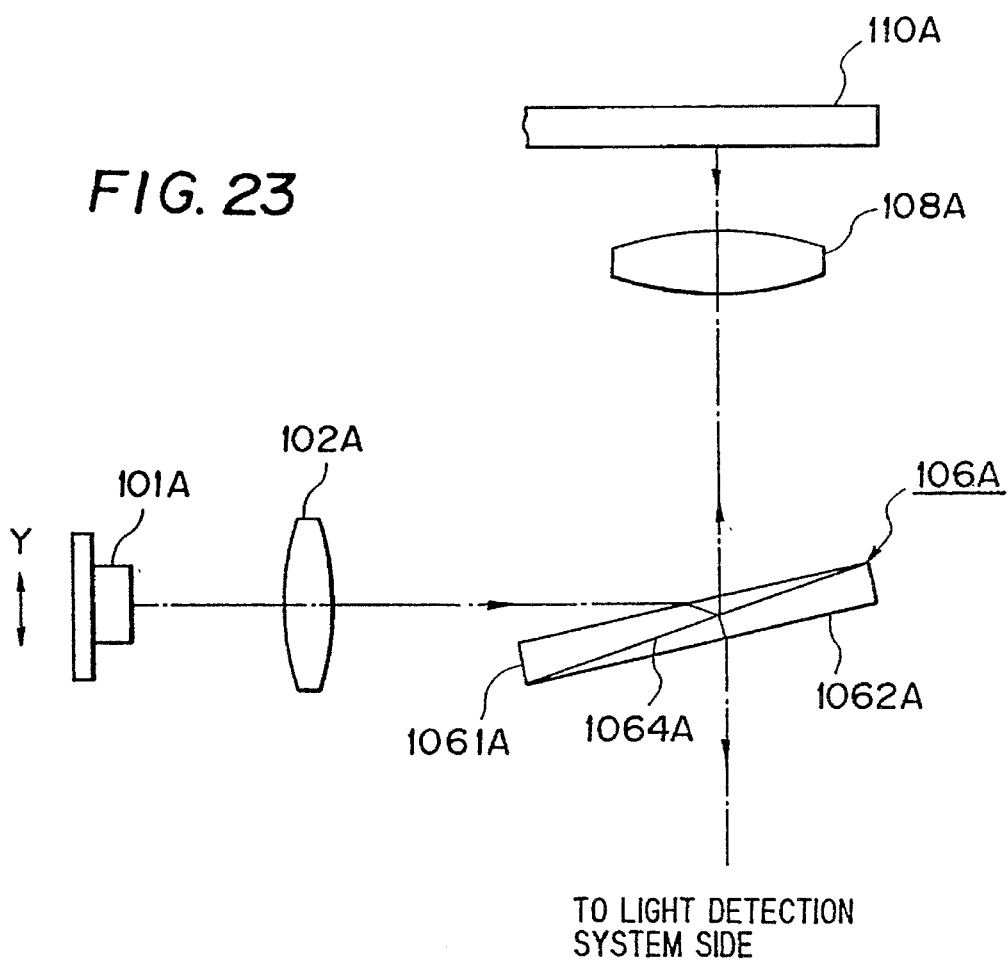
FIG. 23 is a schematic view illustrating an MO type of optical pickup device according to a different embodiment of the present invention.

FIG. 23 is a block diagram of a MO (Magnet Optical) type of optical pickup device according to still furthermore different embodiment of the present invention. In this figure, the differences from that shown in FIG. 19 are a point that the optical disk 110 a based on an photoelectro-magnetic recording system is provided with the ¼ wavelength plate 107A removed, and a point that a semi-transmissive film 1064A is formed on the junction face between the two pieces of wedge-shaped prism 1061A and 1062A. This semi-transmissive film 1064A transmits a portion of incoming light irrespect of the direction of polarization and reflects a remaining portion of the light flux.

In this configuration, linear polarized laser light is irradiated from the semiconductor laser 101A. The irradiated light is converted to parallel light when passing through the coupling lens 102A and goes into the optical element 106A. A portion of the incidence light passes through the semi-transmissive film 1064A, and the remaining portion thereof is reflected by the semi-transmissive film 1064A. The reflected light is focused by the object lens 108A and irradiated onto the optical disk 110A.

The reflected light from the optical disk 110A goes via the object lens 108A into the optical element 106A. The light introduced into the optical element 106A is divided to light transmitting the film and that reflected by the semi-transmissive film 1064A like in the case described above. Of these two types of light, the light transmitting the film goes into the light detection system.

The light detection system detects the incidence light and regenerate data recorded in the optical disk 110A, or detects displacement of a focus of a laser spot formed on the optical disk 110A or displacement in tracking. In this case, the recorded data is regenerated by detecting a difference of illuminance between a P polarized portion of the incidence light and a S polarized portion thereof.

Thus by forming the semi-transmissive film 1064A on the junction face between the two pieces of wedge-shaped prism 1061A and 1062A, it is possible to use the same in a MO type of optical pickup device. with this feature, in a MO type of optical pickup device, like in the embodiments described above, light irradiated from the semiconductor laser 101A can be used effectively.

Also, if a multi-layered film which reflects a portion of P polarized light and transmit almost all of S polarized light is formed on the junction face, the S/N ratio of a photoelectromagnetic signal can be improved.

Figure 24:
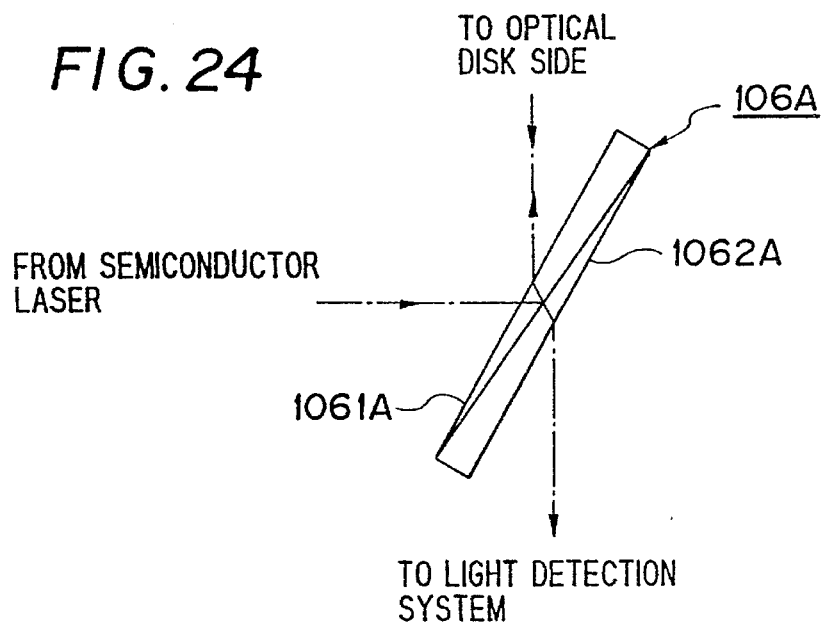
FIG. 24 is a view illustrating a method of using an optical element for narrowing width of a light flux.

Although in description of the embodiments above it is assumed that an oval light flux irradiated from the semiconductor laser 101A is shaped to a circular one by enlarging it in the direction of minor axis thereof, it may be shaped by compressing in the direction of major axis thereof. In this case, as shown in FIG. 24, the optical element 106A is inclined in the contrary direction at an acute angle. Also the semiconductor laser 101A is arranged so that a direction of the chips active layer is in the X-direction. With this configuration, an oval light flux wider in the Y-direction is shaped to a circular one.

In each of the embodiments described above, the optical axis of light flux introduced into the optical element 106A and that irradiated from the optical element 106A are either parallel or vertical to each other, but it is needless to say that the directions may be different.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical pickup device, which comprises:
    a light source having a light flux output of non-circular cross-section;
    a multi-functional single body prism in optical alignment with said light source;
    at least one light directing optical member configured to focus light received from said multi-functional prism onto a optical recording medium and to direct light reflected from said optical recording medium to said multi-functional prism; and
    a light detection system aligned with said multi-functional prism and configured to receive light reflected by said optical recording medium;
    wherein said multi-functional prism has at least one face configured to shape said light flux outputted from said light source to a substantially circular beam, to direct said beam to said at least one light directing member, to separate light reflected from said optical recording medium from said source light, and to guide said reflected light separated from said source light to said light detection system; and
    wherein a following expression is established in said multi-functional prism, such that an incidence angle of said light flux outputted from said semiconductor laser chip light source is a, and an angle between an incidence face of said multi-functional prism for said light flux and a first outgoing irradiation face of said multi-functional prism for said light flux subjected to beam shaping is α, an angle between said incidence face and a second outgoing irradiation face of said multi-functional prism from which said light flux subjected to light separation guided from said multi-functional prism is β, and an index of refraction of a material for said multi-functional prism is n:

$$\alpha + \beta + \left| \sin^{-1}\left[ n\sin\left\{ \sin^{-1}\left( \frac{\sin a}{n} \right) - \alpha \right\} \right] \right| + \left| \sin^{-1}\left[ n\sin\left\{ \sin^{-1}\left( \frac{\sin a}{n} \right) - \beta \right\} \right] \right| = 90°$$

2. An optical pickup device according to claim 1, wherein said multi-functional prism has a right-angled isosceles triangular form and a face corresponding to a bottom edge of a bottom edge thereof functions as a face for beam shaping as well as that for light separation.

3. An optical pickup device according to claim 1, wherein said multi-functional prism has a face which functions as a face for beam shaping as well as that for light separation on a same face and of said side faces a face from which a light flux subjected to beam shaping goes out and a face from which a light flux subjected to light separation goes out are set at an angle other than a right angle to an optical axis respectively.

4. An optical pickup device according to claim 1, wherein said at least one face of said multi-functional prism comprises a single face for directing light to said at least one light directing member and for separating said source light from said reflected light.

5. An optical pickup device according to claim 4, wherein in said multi-functional prism, an incidence angle of said light flux outputted from said light source is a, an angle between said incidence angle of said light flux and an outgoing irradiation face of said multi-functional prism from which said light flux is directed to said at least one light directing member is α, and an index of refraction of material for said multi-functional prism is n, and a relationship among a, α and n is expressed by the following expression.

$$\left| \sin^{-1}\left( \frac{\sin a}{n} \right) \right| + \left| \sin^{-1}\left( \frac{\sin 45°}{n} \right) \right| - \alpha$$

6. An optical pickup device, which comprises:

a laser light source having a light flux output of non-circular cross-section;

a multi-functional single body prism in optical alignment with said light source;

at least one light directing optical member configured to focus light received from said multi-functional prism onto a optical recording medium and to direct light reflected from said optical recording medium to said multi-functional prism; and a light detection system aligned with said multi-functional prism and configured to receive light reflected by said optical recording medium;

wherein said multi-functional prism has at least one face configured to shape said light flux outputted from said laser light source to a substantially circular beam, to direct said beam to said at least one light directing member, to separate light reflected from said optical recording medium from said source light, and to guide said reflected light separated from said source light to said light detection system, wherein said multifunctional prism includes:

a first wedge-shaped prism to shape said beam light flux; and a second wedge-shaped prism assembled with and joined to said first wedge-shaped prism, wherein a junction face between said first wedge-shaped prism and said second wedge-shaped prism functions as a face for light separation;

wherein said first wedge-shaped prism and said second wedge-shaped prism have the same form and a slat face of said first wedge-shaped prism is jointed to that of said second wedge-shaped prism to form a pair of parallel planes; and wherein an incidence angle of light flux coming into said first wedge-shaped prism is "a", an index of refraction of said first wedge-shaped prism is "n", and a vertical angle of said first wedge-shaped prism is "x", and a relation among "a", "n" and "x" is expressed by the following expression:

$$\cos(a) = n \cdot \sin\left( \arcsin\left( \frac{\sin(a)}{n} \right) - 2 \cdot x \right).$$

7. An optical pickup device, which comprises:

a laser light source having a light flux output of non-circular cross-section;

a multi-functional single body prism in optical alignment with said light source;

at least one light directing optical member configured to focus light received from said multi-functional prism onto a optical recording medium and to direct light reflected from said optical recording medium to said multi-functional prism; and a light detection system aligned with said multi-functional prism and configured to receive light reflected by said optical recording medium;

wherein said multi-functional prism has at least one face configured to shape said light flux outputted from said laser light source to a substantially circular beam, to direct said beam to said at least one light directing member, to separate light reflected from said optical recording medium from said source light, and to guide said reflected light separated from said source light to said light detection system, and wherein in said multi-functional prism a first outgoing irradiation face from which said light flux subjected to beam shaping goes out to a light detection system does not cross an optical axis of said outgoing light flux and at said same time said optical axis of said light flux passing through said first outgoing irradiation face of said multi-functional prism crosses the optical axis of said light flux passing through a second outgoing irradiation face in a side of said light detection system at right angles.

8. An optical pickup device, which comprises:

a laser light source having a light flux output of non-circular cross-section;

a multi-functional single body prism in optical alignment with said light source;

at least one light directing optical member configured to focus light received from said multi-functional prism onto a optical recording medium and to direct light reflected from said optical recording medium to said multi-functional prism; and a light detection system aligned with said multi-functional prism and configured to receive light reflected by said optical recording medium;

wherein said multi-functional prism has at least one face configured to shape said light flux outputted from said laser light source to a substantially circular beam, to direct said beam to said at least one light directing member, to separate light reflected from said optical recording medium from said source light, and to guide said reflected light separated from said source light to said light detection system, and wherein a ¼ wavelength plate is monolithically attached to a face of said multi-functional prism from which said light flux goes out to said optical recording medium.

9. An optical pickup device, which comprises:

a laser light source having a light flux output of non-circular cross-section;

a multi-functional single body prism in optical alignment with said light source;

at least one light directing optical member configured to focus light received from said multi-functional prism onto a optical recording medium and to direct light reflected from said optical recording medium to said multi-functional prism; and a light detection system aligned with said multi-functional prism and configured to receive light reflected by said optical recording medium;

wherein said multi-functional prism has at least one face configured to shape said light flux outputted from said laser light source to a substantially circular beam, to direct said beam to said at least one light directing member, to separate light reflected from said optical recording medium from said source light, and to guide said reflected light separated from said source light to said light detection system, and wherein in said multifunctional prism a first outgoing irradiation face from which said light flux subjected to beam shaping goes out to a side of an optical recording medium does not cross an optical axis of said outgoing light flux at right angles, an angle between said optical axis of said light flux passing through said first outgoing irradiation face of said multi-functional prism and said optical axis of said light flux passing through a second outgoing irradiation face of said multi-functional prism to said side of light detection system is a right angle, and a ¼ wavelength plate is monolithically attached to a face from which said light flux goes out to said side of said optical recording medium.

10. An optical pickup device, which comprises:

a laser light source having a light flux output of non-circular cross-section;

a multi-functional single body prism in optical alignment with said light source;

at least one light directing optical member configured to focus light received from said multi-functional prism onto a optical recording medium and to direct light reflected from said optical recording medium to said multi-functional prism; and a light detection system aligned with said multi-functional prism and configured to receive light reflected by said optical recording medium;

wherein said multi-functional prism has at least one face configured to shape said light flux outputted from said laser light source to a substantially circular beam, to direct said beam to said at least one light directing member, to separate light reflected from said optical recording medium from said source light, and to guide said reflected light separated from said source light to said light detection system, and wherein in said multi-functional prism an outgoing irradiation from which said light flux subjected to beam shaping goes out to said optical recording medium does not cross an optical axis of said outgoing light flux, and a ½ wavelength plate is monolithically attached to a face from which said light flux goes out to said light detection system.

11. An optical pickup device, which comprises:

a laser light source having a light flux output of non-circular cross-section;

a multi-functional single body prism in optical alignment with said light source;

at least one light directing optical member configured to focus light received from said multi-functional prism onto a optical recording medium and to direct light reflected from said optical recording medium to said multi-functional prism; and a light detection system aligned with said multi-functional prism and configured to receive light reflected by said optical recording medium;

wherein said multi-functional prism has at least one face configured to shape said light flux outputted from said laser light source to a substantially circular beam, to direct said beam to said at least one light directing member, to separate light reflected from said optical recording medium from said source light, and to guide said reflected light separated from said source light to said light detection system, and wherein in said multi-functional prism a first outgoing irradiation face from which said light flux subjected to beam shaping goes out to said optical recording medium does not cross an optical axis of said outgoing light flux, an angle between said optical axis of said light flux passing through said first outgoing irradiation face of said multi-functional prism and said optical axis of said light flux passing through a second outgoing irradiation face of said multi-functional prism in a side of said light detection system is a right angle, and a ½ wavelength plate is monolithically attached to said face from which said light flux goes out to said light detection system.

* * * * *